US008970767B2

(12) United States Patent
Gruhlke et al.

(10) Patent No.: US 8,970,767 B2
(45) Date of Patent: Mar. 3, 2015

(54) IMAGING METHOD AND SYSTEM WITH ANGLE-DISCRIMINATION LAYER

(75) Inventors: Russell Wayne Gruhlke, Milpitas, CA (US); Ye Yin, Santa Clara, CA (US); Zheng-wu Li, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 543 days.

(21) Appl. No.: 13/164,957

(22) Filed: Jun. 21, 2011

(65) Prior Publication Data

US 2012/0327288 A1 Dec. 27, 2012

(51) Int. Cl.
| | | |
|---|---|---|
| H04N 5/225 | (2006.01) |
| G09G 5/00 | (2006.01) |
| G02B 13/00 | (2006.01) |
| G06F 3/042 | (2006.01) |
| G09G 3/34 | (2006.01) |

(52) U.S. Cl.
CPC .............. *G02B 13/001* (2013.01); *G06F 3/042* (2013.01); *G09G 3/3466* (2013.01)
USPC .......................................... 348/340; 345/214

(58) Field of Classification Search
CPC ............... G02B 27/017; G02B 17/006; G02B 2027/014; G02B 2027/0127; G02B 5/3083; G02B 6/0036; G02B 6/0041; G02B 6/0046; G02B 6/0055; G06F 3/005; G06F 3/011; G06F 3/017; G06Q 30/02; B29D 11/0073
See application file for complete search history.

(56) References Cited

U.S. PATENT DOCUMENTS

| 5,448,659 A | 9/1995 | Tsutsui et al. |
|---|---|---|
| 5,856,842 A | 1/1999 | Tedesco |
| 6,040,937 A | 3/2000 | Miles |
| 6,042,235 A * | 3/2000 | Machtig et al. ................. 353/28 |
| 6,323,892 B1 | 11/2001 | Mihara |
| 6,603,520 B2 | 8/2003 | Umemoto |
| 6,631,998 B2 | 10/2003 | Egawa et al. |
| 6,652,109 B2 | 11/2003 | Nakamura |
| 6,674,562 B1 | 1/2004 | Miles |
| 6,826,000 B2 | 11/2004 | Lee et al. |

(Continued)

FOREIGN PATENT DOCUMENTS

| EP | 1 191 777 | 3/2002 |
|---|---|---|
| EP | 1887790 A1 | 2/2008 |

(Continued)

OTHER PUBLICATIONS

International Search Report and Written Opinion No. PCT/US2012/042504 dated Jan. 9, 2013.

(Continued)

*Primary Examiner* — Trung Diep
(74) *Attorney, Agent, or Firm* — Knobbe, Martens, Olson & Bear LLP

(57) ABSTRACT

This disclosure provides systems, methods and apparatus for an imaging system that includes a light guide having light-turning features that are configured to receive ambient light incident on the light guide, including light scattered from a scene to be imaged, and to direct the received ambient light towards an image sensor. The light-turning features may have angle-discriminating properties so that some light-turning features capture light incident upon the light guide at certain angles of incidence, but not others. Light scattered from multiple parts of a scene to be imaged may then be directed to correlated locations on an image sensor, which provides electronic data representing an image.

38 Claims, 20 Drawing Sheets

(56) References Cited

U.S. PATENT DOCUMENTS

| | | | |
|---|---|---|---|
| 6,863,414 | B2 | 3/2005 | Ho |
| 6,927,387 | B2 | 8/2005 | Viktorovitch |
| 7,123,216 | B1 | 10/2006 | Miles |
| 7,256,764 | B2 | 8/2007 | Izumi |
| 7,327,510 | B2 | 2/2008 | Cummings et al. |
| 7,376,308 | B2 | 5/2008 | Cheben et al. |
| 7,450,105 | B2 | 11/2008 | Nakamura et al. |
| 7,548,677 | B2 | 6/2009 | Bathiche et al. |
| 7,609,310 | B2 | 10/2009 | Miyagawa |
| 7,664,350 | B2 | 2/2010 | Ghosh et al. |
| 7,667,789 | B2 | 2/2010 | Choi et al. |
| 7,817,885 | B1 | 10/2010 | Moore et al. |
| 7,916,167 | B2 | 3/2011 | Miyagawa et al. |
| 7,923,799 | B2 | 4/2011 | Lenchenkov |
| 7,924,415 | B2 | 4/2011 | Leviton |
| 7,973,779 | B2 * | 7/2011 | Masalkar ............... 345/175 |
| 8,289,248 | B2 | 10/2012 | Kunkel |
| 8,629,855 | B2 | 1/2014 | Pienimaa et al. |
| 8,797,297 | B2 | 8/2014 | Yabuta et al. |
| 2005/0212774 | A1 | 9/2005 | Ho et al. |
| 2005/0243439 | A1 | 11/2005 | Tomita et al. |
| 2008/0089653 | A1 | 4/2008 | Hall |
| 2008/0121787 | A1 | 5/2008 | Pyo et al. |
| 2008/0284925 | A1 | 11/2008 | Han |
| 2009/0061945 | A1 * | 3/2009 | Ma ............... 455/566 |
| 2009/0126777 | A1 | 5/2009 | Khazeni et al. |
| 2009/0126792 | A1 | 5/2009 | Gruhlke et al. |
| 2009/0141285 | A1 | 6/2009 | Levola et al. |
| 2009/0167676 | A1 | 7/2009 | Edwards et al. |
| 2009/0320899 | A1 | 12/2009 | Schiavoni |
| 2010/0188367 | A1 | 7/2010 | Nagafuji et al. |
| 2010/0278480 | A1 | 11/2010 | Vasylyev |
| 2010/0302196 | A1 | 12/2010 | Han et al. |
| 2011/0157093 | A1 | 6/2011 | Bita et al. |
| 2011/0242074 | A1 * | 10/2011 | Bert et al. ............... 345/207 |
| 2011/0273906 | A1 | 11/2011 | Nichol et al. |
| 2012/0069232 | A1 | 3/2012 | Chui et al. |
| 2012/0188616 | A1 | 7/2012 | Takeda et al. |
| 2012/0217881 | A1 | 8/2012 | Sethi et al. |
| 2012/0236390 | A1 | 9/2012 | Wang et al. |
| 2014/0146088 | A1 | 5/2014 | Wyrwas et al. |

FOREIGN PATENT DOCUMENTS

| | | |
|---|---|---|
| JP | 11 211999 | 8/1999 |
| JP | 2002-072284 | 3/2002 |
| JP | 2004515170 A | 5/2004 |
| JP | 2007506180 A | 3/2007 |
| JP | 2008242996 A | 10/2008 |
| JP | 2009252210 A | 10/2009 |
| JP | 2009 0300966 | 12/2009 |
| WO | WO 00/50807 | 8/2000 |
| WO | WO 01/84251 | 11/2001 |
| WO | WO 02/45413 | 6/2002 |
| WO | WO 2005/026938 | 3/2005 |
| WO | WO 2005/029396 | 3/2005 |
| WO | WO-2005029395 A2 | 3/2005 |
| WO | WO-2006082444 A2 | 8/2006 |
| WO | WO 2007/003196 | 1/2007 |
| WO | WO 2008/045207 | 4/2008 |
| WO | WO 2009/020940 | 2/2009 |
| WO | WO-2009065069 A1 | 5/2009 |
| WO | WO-2010027944 A2 | 3/2010 |
| WO | WO-2011129131 A1 | 10/2011 |

OTHER PUBLICATIONS

Large et al., "Parallel Optics in Waveguide Displays: A Flat Panel Autostereoscopic Display", Journal of Display Technology, vol. 6, No. 10, pp. 431-437, Oct. 2010.

Travis et al. "Image Capture via a Wedge Light-Guide with no Margins", Optics Express, vol. 18, No. 8, pp. 8453-8458, Apr. 7, 2010.

Boual, et al., "72.3: Wedge Displays as Cameras", 2006 SID International Symposium, vol. XXXVII, May 24, 2005, pp. 1999-2002.

Invitation to Pay Additional Fees in International Application No. PCT/US2012/042504 dated Sep. 19, 2012.

Candes, at al., "Compressive Sampling." Int. Congress of Mathematics, 3, pp. 1433-1452, Madrid, Spain, 2006.

Candes E. J., et al., "An Introduction To Compressive Sampling [A sensing/sampling paradigm that goes against the common knowledge in data acquisition]" IEEE Signal Processing Magazine, IEEE Service Center, Piscataway, NJ, US, vol. 24, No. 2, Mar. 1, 2008, pp. 21-30, XP011206127.

Candes E.J., et al., "Robust Uncertainty Principles: Exact Signal Reconstruction From Highly Incomplete Frequency Information", IEEE Transactions on Information Theory, vol. 52, No. 2, Feb. 2006, pp. 489-509.

"Compressive Imaging: A New Single-Pixel Camera," Rice DSP, retrieved on Nov. 5, 2012, pp. 4, retrieved from http://dsp.rice.edu/cscamera.

Duarte, et. al., "Single-Pixel Imaging via Compressive Sampling," IEEE Signal Processing Magazine, Mar. 2008, pp. 83-91.

Supplemental Written Opinion in International Application No. PCT/US2012/042504 dated Jul. 10, 2013.

Landon, Bill "Toshiba Debuts First Full-Color 'System on Glass' (SOG) Input Display with Image Cap Technology," PDA Today, May 25, 2004, pp. 1-3, URL: http://www.pdatoday.com/more/A1622.

Wikipedia, "Compressed Sensing," Retrieved from the internet: http://en.wikipedia.org/wiki/Compressive_sampling, retrieved Nov. 5, 2012, pp. 1-4.

* cited by examiner

Common Voltages

| | | $VC_{ADD\_H}$ | $VC_{HOLD\_H}$ | $VC_{REL}$ | $VC_{HOLD\_L}$ | $VC_{ADD\_L}$ |
|---|---|---|---|---|---|---|
| Segment Voltages | $VS_H$ | Stable | Stable | Relax | Stable | Actuate |
| | $VS_L$ | Actuate | Stable | Relax | Stable | Stable |

IMAGING METHOD AND SYSTEM WITH ANGLE-DISCRIMINATION LAYER

TECHNICAL FIELD

This disclosure relates to electronic imaging systems and to electromechanical systems.

DESCRIPTION OF THE RELATED TECHNOLOGY

Electromechanical systems include devices having electrical and mechanical elements, actuators, transducers, sensors, optical components (e.g., minors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Many devices (including mobile devices) include displays, such as interferometric modulator displays, and also cameras. Often, the display includes a flat screen area and the camera includes a relatively small aperture with a lens that focuses ambient light from a relatively wide range of incoming angles onto a relatively small area of an image sensor. To meet market demands and design criteria for devices incorporating cameras, new camera systems are continually being developed.

SUMMARY

The systems, methods and devices of the disclosure each have several innovative aspects, no single one of which is solely responsible for the desirable attributes disclosed herein.

One innovative aspect of the subject matter described in this disclosure can be implemented in an imaging system that includes a light guide, an image sensor and light-turning features disposed on a first surface of the light guide. The light guide has a front surface capable of receiving ambient light and also has a light-output surface. The image sensor is disposed along the light-output surface of the light guide. The light-turning features include a plurality of light-turning pixels disposed on a first surface of the light guide. The plurality of light-turning pixels are configured to receive the ambient light and to direct the received ambient light towards the image sensor.

In another implementation, an imaging system may be manufactured by providing a light guide, providing an image sensor and providing light turning features. The light guide has a front surface capable of receiving ambient light and a light-output surface. The image sensor is disposed along the light-output surface of the light guide. The light-turning features form a plurality of light-turning pixels disposed on a first surface of the light guide. The light-turning pixels are configured to receive ambient light and to direct the received ambient light towards the image sensor.

In another implementation, an imaging system may include a light guide, an image sensor and an angle-discrimination means for selectively capturing light from different incidence angles and directing the captured light toward the image sensor. The light guide has a front surface capable of receiving ambient light and a light-output surface. The image sensor is disposed along the light-output surface of the light guide.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
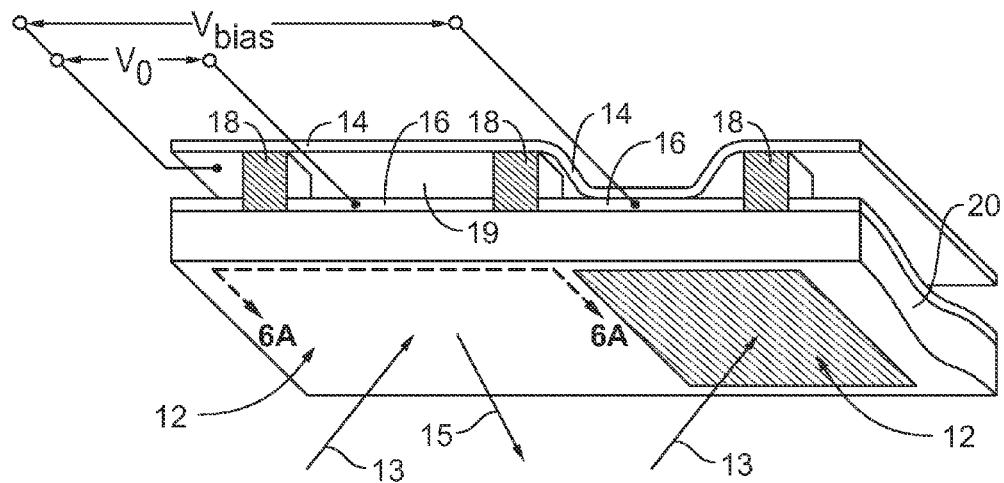
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., electromechanical systems (EMS), MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Many devices, including display devices, include a camera. The camera may include one or more lenses that focus light onto an image sensor to capture an image of a scene and create an image representing the scene. The lens(es) may be configured to accept ambient light that is incident upon the lens(es) from a range of angles and to collimate the light to be incident upon an image sensor. The image sensor may be configured to generate digital data that represents the scene and may be displayed as an image on a display or printed onto a sheet. The lens(es) may allow a camera to capture an image that includes objects and features of objects with large angular displacements from the axis of the lens, where the axis is typically perpendicular to the spherical surface of the lens and passes through the center of the lens. Cameras can be difficult to integrate into devices where a small or thin form factor is desired, since the cameras can be relatively deep and bulky structures, due to, e.g., the need to accommodate optical elements and to provide a length for light to properly focus on an image sensor. Simply reducing the sizes of the cameras, however, can reduce the apertures of the cameras, which can decrease light collection efficiency and degraded image quality.

In some implementations, a light guide may be used as a "lens" for an imaging system, where the "lens" acts much like a conventional lens of a camera to capture light and direct the light to an image sensor. The light guide can provide a relatively large surface area for capturing light and, in some implementations, a substantially flat surface that can be integrated into devices to provide other functionality. In some implementations, the imaging system includes an angle-discrimination layer on a light guide, the angle-discrimination layer and the light guide acting together to direct light to an image sensor. In some implementations, the angle-discrimination layer may include a film having multiple light-turning pixels, each pixel configured to turn light rays from their incident direction towards a particular location on an image sensor. Each pixel may include light-turning features that accept light from a particular incident direction, or a small range of angles around a particular incident direction. In some implementations, each pixel accepts light within an acceptance cone, with the acceptance cone having a center axis extending in a fixed direction. Different pixels may accept light from different incident directions, allowing the angle-discrimination layer to thereby accept and re-direct light from various directions in order to capture a scene. A known mapping of the incident direction accepted by the pixels to the location on an image sensor associated with each incident direction (and pixel) may then allow for the captured scene to be reconstructed or saved and re-displayed. In some implementations, there is a one-to-one correspondence between a pixel and a location on image sensor. In some other implementations, a pixel may direct light to more than one location on the image sensor, or more than one pixel may direct light to the same location, and the particular pixel or pixels directing light to a given location is known.

Particular implementations of the subject matter described in this disclosure can be implemented to realize one or more of the following potential advantages. For example, in some implementations, exceptionally thin imaging systems may be formed. In some other implementations, the number of components of an electrical device, such as a smartphone or mobile computing device, may be reduced where surfaces can be used for more than one purpose, e.g., for both displaying and capturing images. In some implementations, a display for a computer, cell phone, smartphone, personal digital assistant, or other mobile device, including mobile devices, may be able to both display images to a viewer while also collecting ambient light for imaging objects that are in front of the display. In this way the display may serve both the purpose of displaying and taking images. In some implementations, e.g., in a two-way video communication system, two or more video conference participants may watch live video images of each other. The display screen used by a participant may itself include an imaging system to take a live, moving image of the participant to send for the other participants to view.

An example of a suitable electromechanical systems (EMS) or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
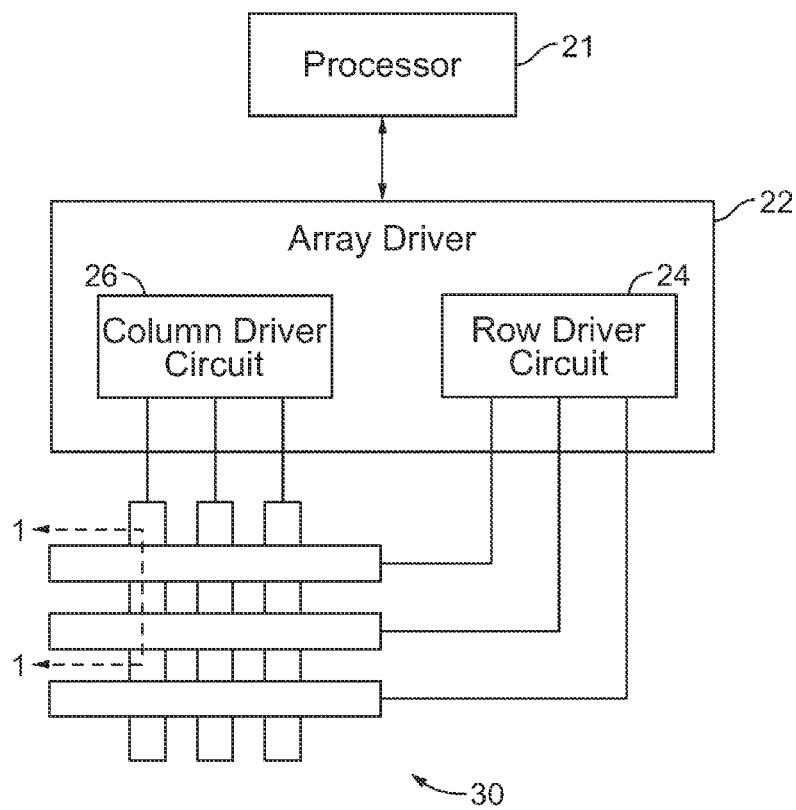
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
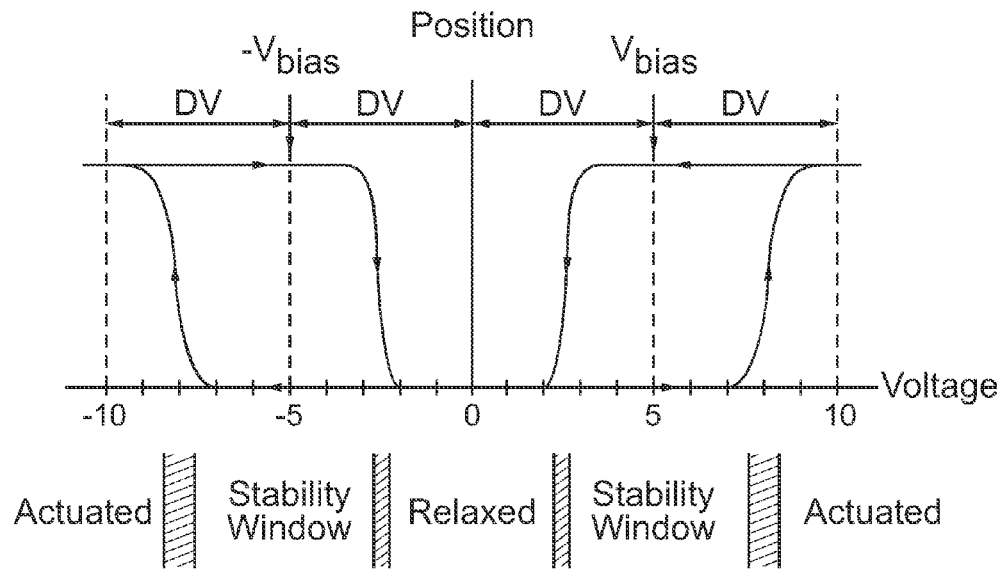
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or minor, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
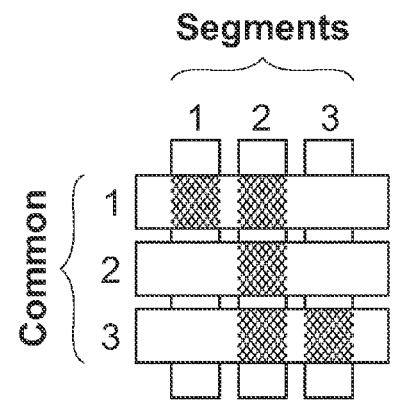
FIG. 5A shows an example of a diagram illustrating a frame of display data in the 3×3 interferometric modulator display of FIG. 2.
Figure 5B:
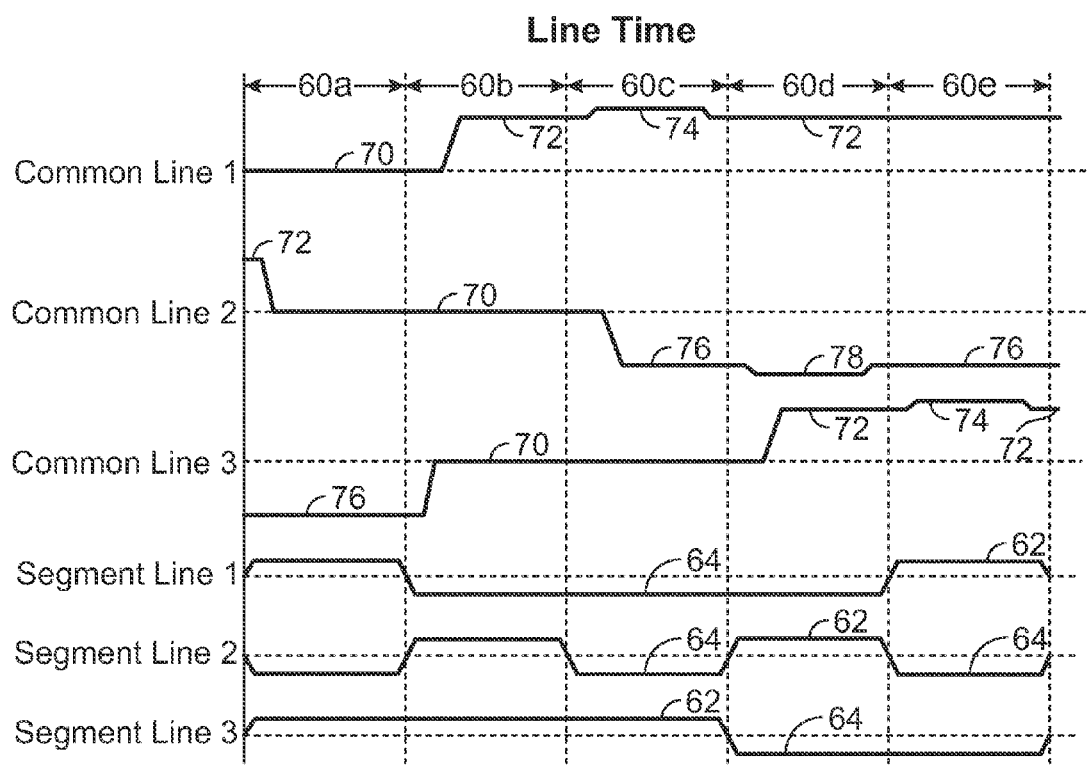
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
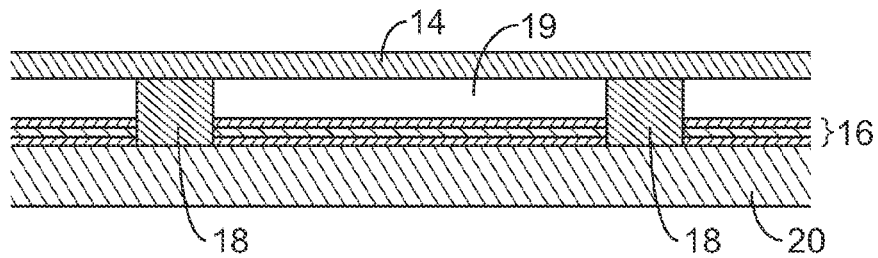
FIG. 6A shows an example of a partial cross-section of the interferometric modulator display of FIG. 1.
Figure 6B:
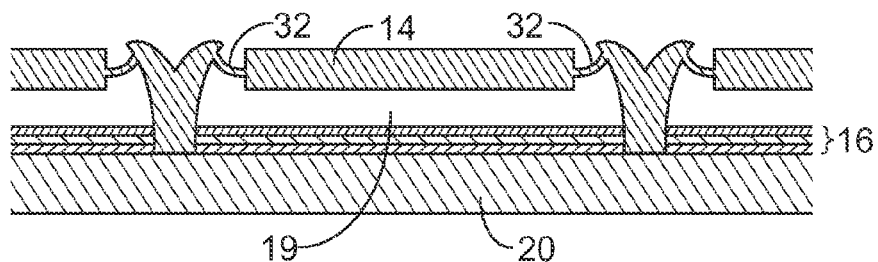
FIGS. 6B-6E show examples of cross-sections of varying implementations of interferometric modulators.
Figure 6C:
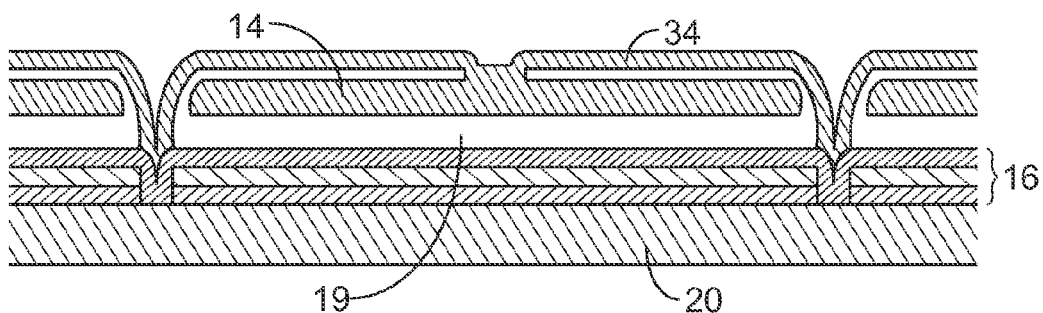

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
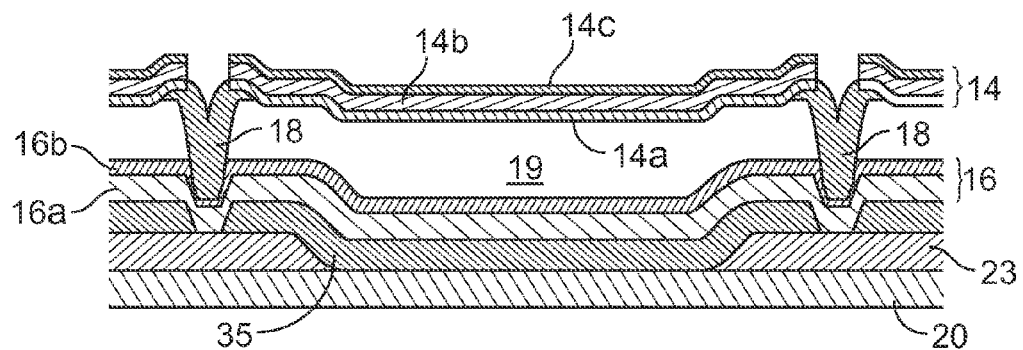

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
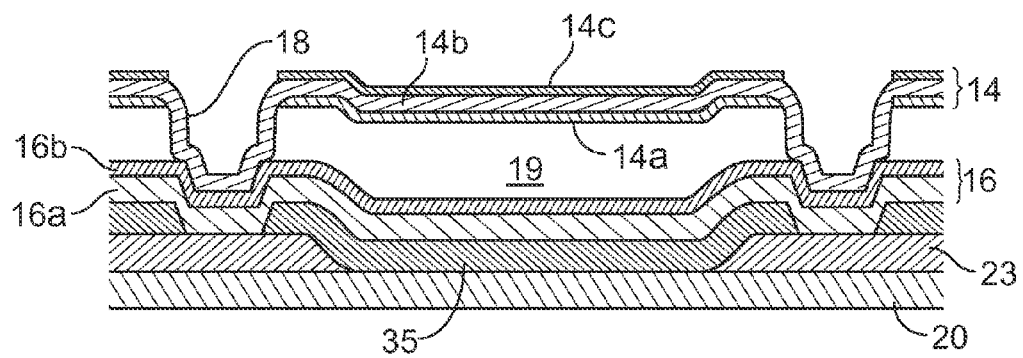

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
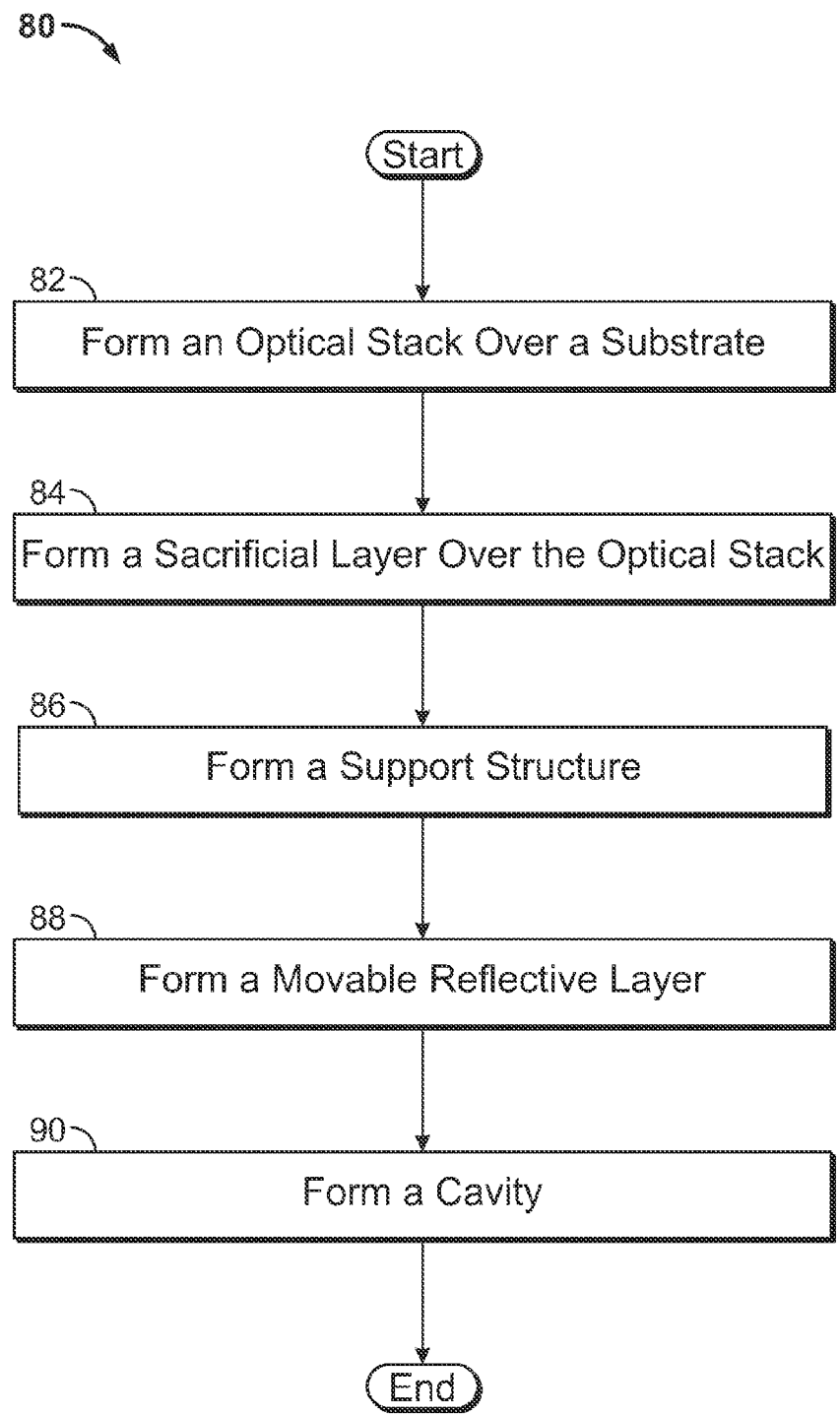
FIG. 7 shows an example of a flow diagram illustrating a manufacturing process for an interferometric modulator.
Figure 8A:
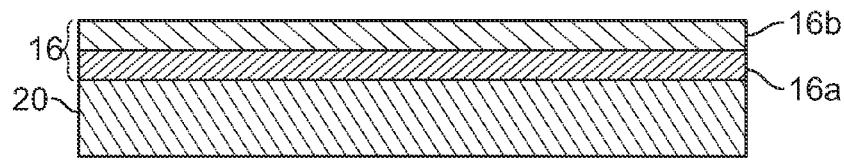
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
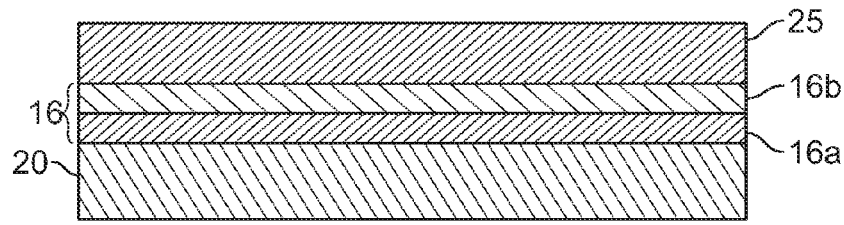

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
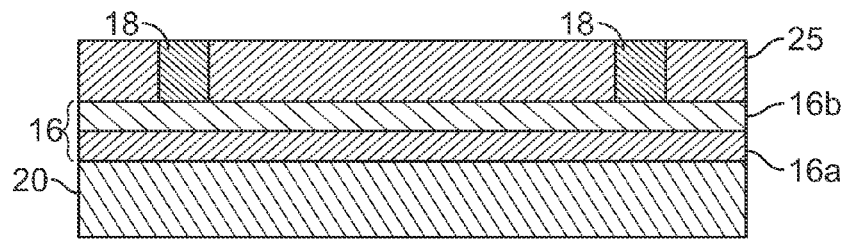

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
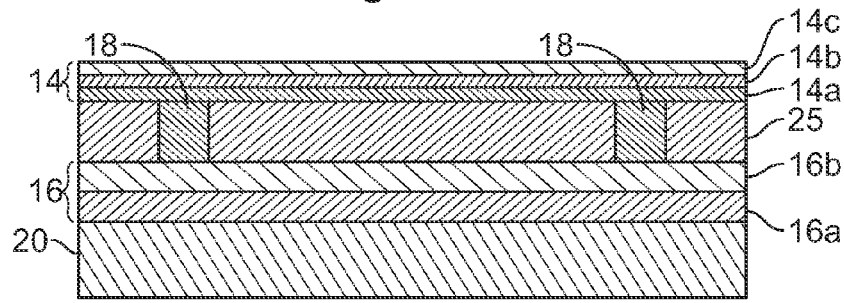
Figure 8E:
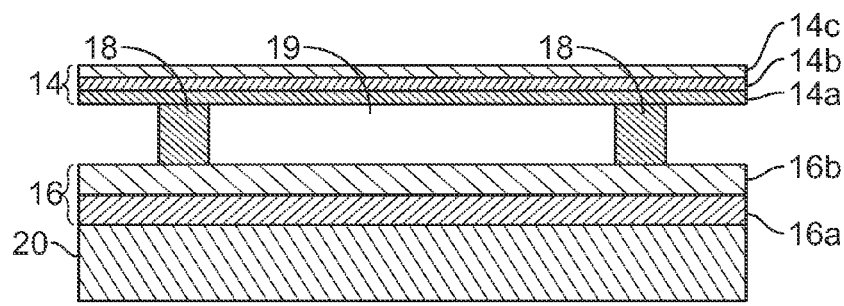

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Various electronic devices, including display devices, may include imaging systems. In some implementations, the imaging system can include an angle-discrimination layer on a surface of a light guide to direct light to an image sensor. The angle-discrimination layer can include a plurality of pixels to direct light to different locations on the image sensor.

Figure 9A:
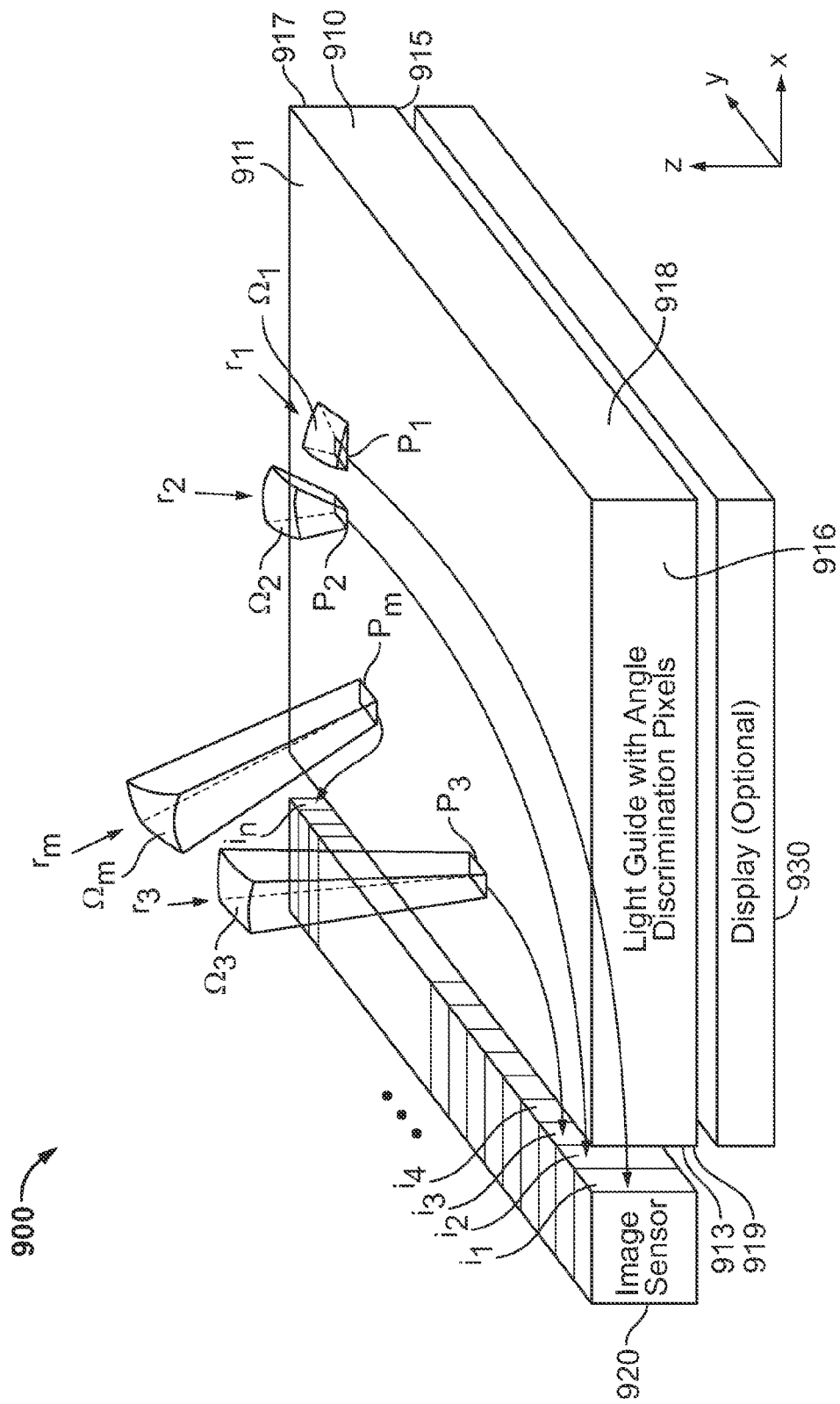
FIG. 9A shows an example of a perspective view of a plurality of light-turning pixels disposed on the surface of a light guide.

With reference now to FIG. 9A, an example of a perspective view of a plurality of light-turning pixels disposed on the surface of a light guide is shown. As illustrated in the implementation of FIG. 9A, an imaging system 900 may include a light guide 910 with an angle-discrimination layer (illustrated as integrated into the body of the light guide 910). Light guide 910 may include a front surface 911 capable of receiving ambient light, represented by light rays $r_1, r_2, r_3, \ldots r_m$. Light rays $r_1, r_2, r_3, \ldots r_m$ may be ambient light rays coming from an object in the ambient environment. For example, rays $r_1, r_2, r_3, \ldots r_m$ may be ambient light scattered from the face of a person in front of the light guide 910. Light guide 910 also may include a light-output surface 913. While the light-output surface 913 is illustrated as one of the edges of the light guide 910, in various implementations, it is possible for the light-output surface to be one or more of the front surface 911, the back surface 915, and one or more of the edges of the light guide disposed about the front 911 and back 915 surfaces (e.g., edges 915, 916, 917 and 918). The imaging system 900 also may include an image sensor 920 disposed along the light-output surface 913 of the light guide.

In some implementations, the image sensor 920 may be capable of sensing light including wavelengths outside of the visible spectrum, and a light source (not shown) for emitting light of those wavelengths may be provided adjacent the light guide 910. Suitable wavelengths include UV and infrared as well as wavelengths within the visible range. Such implementations may be provided with turning features that turn light at wavelengths outside the visible spectrum, thereby minimizing undesired turning of light in the visible spectrum. This can prevent or minimize the impact of those turning features on visible light passing through the light guide 910, e.g., for applications where the light guide 910 is used as a front light to illuminate a display and/or where the light guide 910 is disposed forward of a display and allows light from display elements to pass through it to a viewer. In the operation of some implementations, light at wavelengths outside the visible spectrum is emitted by a light source (not shown) and the light is reflected off an object to be imaged, with the light subsequently captured by the light guide 910 and directed to the image sensor 920.

With continued reference to FIG. 9A, the light guide 910 with angle-discrimination layer may further include light-turning features formed onto one of the surfaces of the light guide 910, for example a first surface of the light guide 910. As illustrated, the first surface is the front surface 911, however, the first surface may be the back surface 915 of the light guide 910 in some implementations. In various implementations, the light-turning features of the angle-discrimination layer may be formed on one of the front surface 911, the back surface 915, or both surfaces. As used herein, the front surface 911 refers to a surface of the light guide 910 facing an object sought to be imaged. The back surface 915 may refer to a surface of the light guide 910 opposite the front surface 911. The light-turning features formed on the first surface may include holograms, diffraction gratings, microstructure, or other optical features capable of acting upon light incident on the light-turning features within a range of incident angles and causing the incident light to enter the light guide 910 and to direct the accepted incident light toward the image sensor 920. The light-turning features may form a plurality of light-turning pixels $P_1, P_2, P_3, \ldots P_m$ disposed on the first surface of the light guide, wherein the plurality of light-turning pixels $P_1, P_2, P_3, \ldots P_m$ are configured to receive ambient light (e.g., rays $r_1, r_2, r_3, \ldots r_m$) and to direct the received ambient light towards the image sensor 920. Each of the plurality of light-turning pixels $P_1, P_2, P_3, \ldots P_m$ may be selective and may only accept light incident upon the pixels within a solid angle $\Omega_1, \Omega_2, \Omega_3, \ldots \Omega_m$ centered about center polar and center azimuth angles of incidence. As used herein, "solid angle" is intended to refer to a two-dimensional angle that represents the area of a segment of a unit sphere, much as a planar angle (in radians) equals the length of an arc of a unit circle. Hence, the center polar and center azimuth angles of incidence represent precise rays extending from a light-turning pixel $P_1, P_2, P_3, \ldots P_m$, while a solid angle represents a cone extending from the pixel. The larger the solid angle, the more rays with different polar and azimuth angles of incidence will be accepted by the pixel. In some implementations, the solid angle corresponds to the cone of acceptance angles for a pixel. At least some of the center polar and center azimuth angles of incidence may differ from each other. In some implementations, the solid angles $\Omega_1, \Omega_2, \Omega_3, \ldots \Omega_m$ also may differ. Hence samples from different directions or areas in the field of view may be directed to correlated locations on the image sensor 920. In some implementations, the light captured or accepted by light-turning pixels $P_1, P_2, P_3, \ldots P_m$ may include wavelengths outside of the visible spectrum, and so the pixels may be configured to act upon light outside of the visible spectrum of light, such as UV or infrared light. In some implementations, the pixels act upon visible light between about 390 to about 750 nm.

Figure 9B:
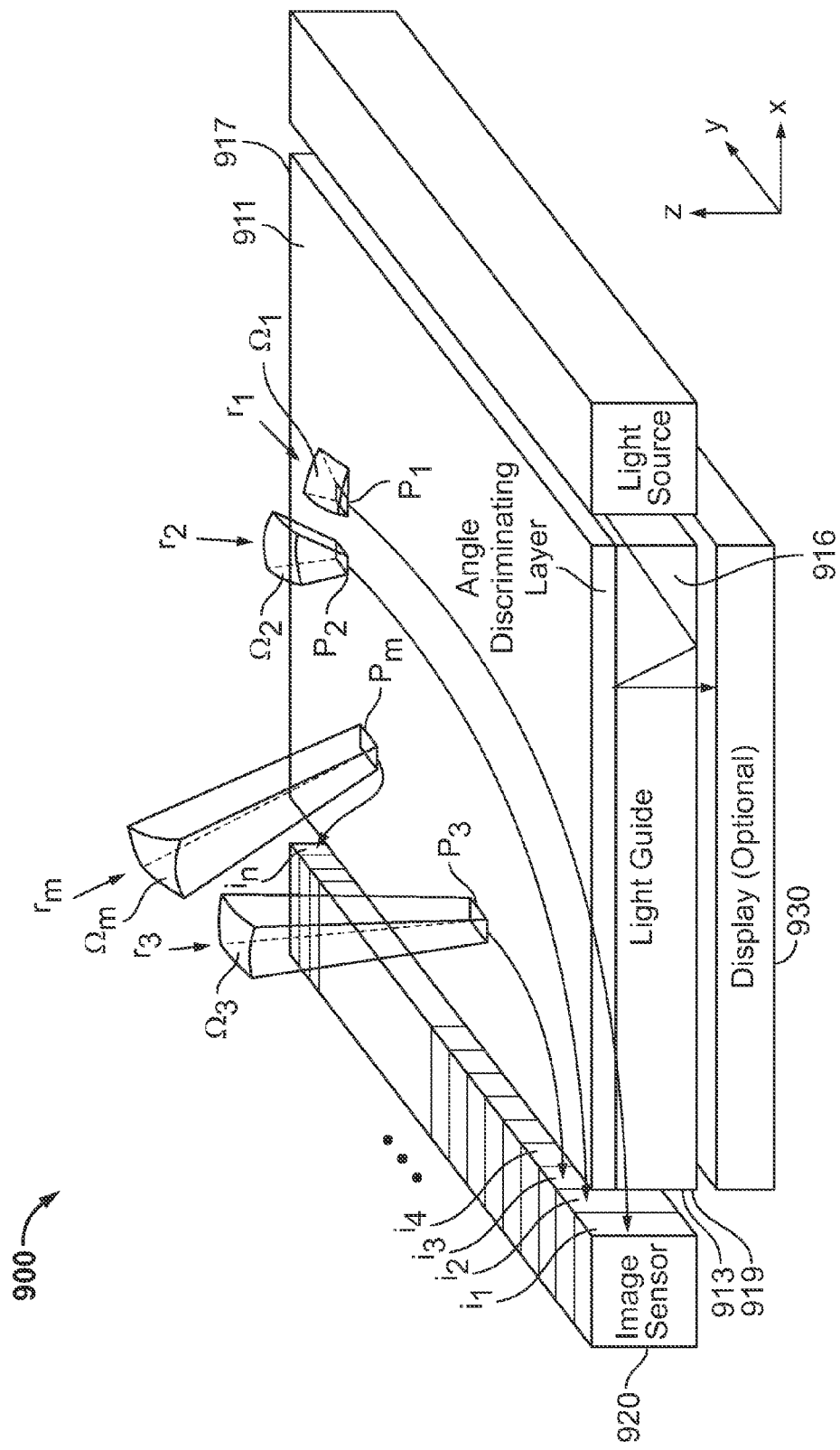
FIG. 9B shows an example of a perspective view of a plurality of light-turning pixels disposed on a layer over the surface of a light guide.

With continued reference to FIG. 9A, the light-turning pixels $P_1, P_2, P_3, \ldots P_m$ may be formed in a pixilated light-turning layer. While the light guide 910 with angle-discrimination layer is shown as a single integral layer in FIG. 9A, the light guide 910 may include one or more layers for guiding light, as well as one or more layers or films for the angle discriminating layer, which may include light-turning features as discussed herein. The angle discrimination layer may be a separate layer from the light guide 910. FIG. 9B shows an example of a perspective view of a plurality of light-turning pixels disposed on a layer disposed over the surface of a light guide. The implementation of FIG. 9B also includes a light source for injecting light into the light guide 910. Such a light source may be useful in applications where the light guide 910 serves as a front light for a display.

With reference to FIGS. 9A and 9B, in some implementations, the light-turning pixels $P_1, P_2, P_3, \ldots P_m$ may include holographic pixels. In some implementations, the holographic pixels may be formed in or on a holographic turning film disposed on the front surface 911 of the light guide 910. In some implementations, the holographic turning film may be laminated onto the light guide 910, or the holographic pixels may be formed directly on the light guide 910. In some implementations, the light-turning pixels $P_1, P_2, P_3, \ldots P_m$ are not holographic. For example, the light-turning pixels $P_1, P_2, P_3, \ldots P_m$ may include light-turning microstructure, light-turning facets, diffraction gratings, or other light-turning features.

Some implementations of the imaging system 900 may optionally include a display 930 underlying the light guide 910. In some implementations, the display 930 is a reflective display. In some implementations, the display 930 is an electromechanical systems display or a reflective electromechanical systems display. In some implementations, the display 930 is an interferometric modulator reflective display provided with interferometric modulators 12 as display elements (FIG. 1). In implementations with a reflective display underlying the light guide 910, the light guide 910 may form part of a front light for illuminating the reflective display 930. In such an implementation, the imaging system 900 may further include a light source (not illustrated) in optical communication with the light guide 910 or front light.

With continued reference to FIGS. 9A and 9B, some implementations of the imaging system 900 that include the display 930 underlying the light guide 910 further include one or more processors (such as processor 21 of FIGS. 2 and 14B) configured to communicate with the display 930 and to process image data for displaying images on the display. The processor also may include a memory device that is configured to communicate with the processor. Such an implementation of the imaging system 900 may be used, for example, in a mobile computing device or smartphone. The imaging system 900 also may further include a driver circuit (such as array driver 22 of FIGS. 2 and 14B) configured to send at least one signal to the display 930, a driver controller 29 (see FIG. 14B) configured to send at least a portion of the image data to the driver circuit, an image source module configured to send the image data to the processor, and an input device 48 (see FIG. 14B) configured to receive input data and to communicate the input data to the processor. The image source module may include at least one of a receiver, transceiver, and transmitter.

Figure 9C:
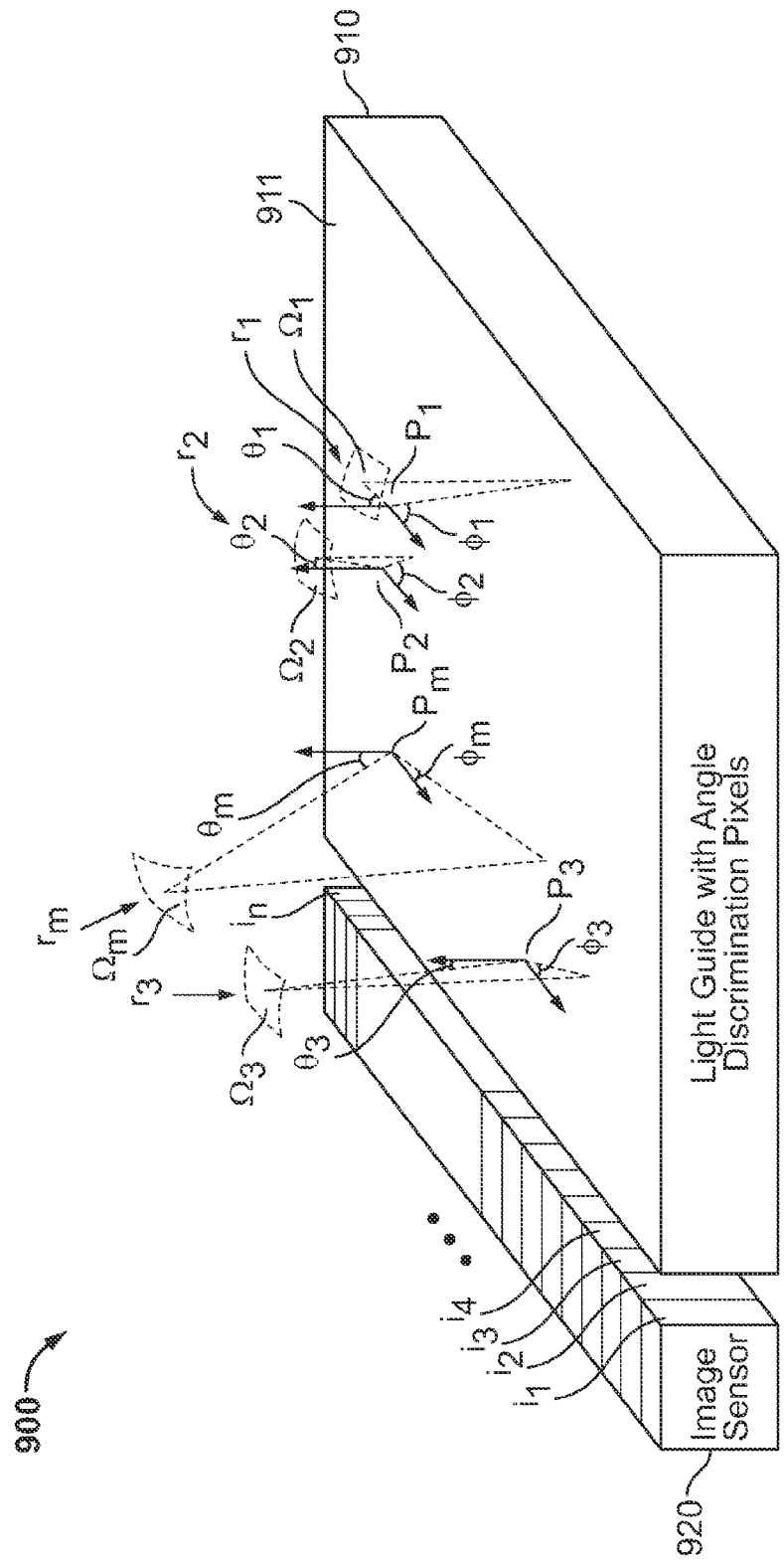
FIG. 9C shows an example of a perspective view of a light guide illustrating different center polar acceptance angles and center azimuth acceptance angles at different locations on the surface of the light guide.

With reference now to FIG. 9C, an example of a perspective view of a light guide 910 illustrating different center polar acceptance angles and center azimuth acceptance angles at different locations on the surface of the light guide 910 is shown. As shown in FIG. 9C, light-turning features at some of the locations, such as light-turning pixels $P_1, P_2, P_3, \ldots P_m$, may be configured to selectively capture the ambient light incident on the pixels within a range of polar acceptance angles and a range of azimuth acceptance angles about a center polar acceptance angle and a center azimuth acceptance angle. In some implementations, the light-turning pixels $P_1, P_2, P_3, \ldots P_m$, may be configured to accept light rays incident at a center polar and center azimuth acceptance angles as well as rays within less than about 10°, about 5°, about 2°, or about 1° from the acceptance angles. Hence, the range of acceptance angles may be less than 1°. For ease of illustration, the outline of the light-turning pixels $P_1, P_2, P_3, \ldots P_m$ on the surface of the light guide 910 is not shown in FIG. 9C. The polar angles may be measured from a normal to the front surface 911 of the light guide 910. Also, the azimuth angles may be measured from an arbitrary ray in the plane of the front surface 911 of the light guide 910. In implementations where the front surface 911 is not planar, the azimuth angle at any particular location on the front surface 911 may be measured from an arbitrary ray in the plane of a tangent plane that is tangent to the front surface 911 at the particular location.

For example, as illustrated in FIG. 9C, ambient light—illustrated as rays $r_1, r_2, r_3, \ldots r_m$—received from a scene to be imaged, such as a scene including a human face or a scene including multiple objects, may be incident upon the light guide 910 at various polar and azimuth angles of incidence. Such light rays incident at various angles carry color and/or light intensity information from different parts of the object(s) or scene being imaged. Each pixel of light-turning pixels $P_1, P_2, P_3, \ldots P_m$ may be configured to accept ambient light received from a scene to be imaged that is incident upon the pixels at a certain center polar angle of incidence, shown as angles $\theta_1, \theta_2, \theta_3, \ldots \theta_m$, and a certain center azimuth angle of incidence, shown as angles $\phi_1, \phi_2, \phi_3, \ldots \phi_m$. In some implementations, the light-turning pixels $P_1, P_2, P_3, \ldots P_m$ in or on the light guide 910 also may accept and/or act upon light rays that are incident upon the pixels at angles close to the center polar angle of incident or the azimuth angle of incidence. In some implementations, different light-turning pixels from light-turning pixels $P_1, P_2, P_3, \ldots P_m$ may accept or receive light incident upon them at different center polar and center azimuth acceptance angles. In other words, light-turning pixel $P_1$ may be configured to accept ambient light incident upon the pixel at center polar angle $\theta_1$ and center azimuth angle $\phi_1$ as well as angles close to these angles (i.e., within a range of acceptance angles). Similarly, light-turning pixel $P_2$ may be configured to accept ambient light incident upon the pixel at center polar angle $\theta_2$ and center azimuth angle $\phi_2$ as well as angles close to these angles, and so forth for remaining pixels $P_3, \ldots P_m$. At least some of polar angles $\theta_1, \theta_2, \theta_3, \ldots \theta_m$ and azimuth angles $\phi_1, \phi_2, \phi_3, \ldots \phi_m$ may differ from each other. Hence, in some implementations, different light-turning pixels $P_1, P_2, P_3, \ldots P_m$ have different center polar $\theta_1, \theta_2, \theta_3, \ldots \theta_m$ and center azimuth acceptance angles $\phi_1, \phi_2, \phi_3, \ldots \phi_m$. Light outside of the acceptance angle for a pixel will not be directed into the light guide 910 and towards the image sensor 920.

Once accepted or received by the light-turning pixels $P_1, P_2, P_3, \ldots P_m$, the light rays $r_1, r_2, r_3, \ldots r_m$ may be directed towards a correlated location $i_1, i_2, i_3, \ldots i_n$ on the image sensor 920. For example, each pixel can be configured to direct light into the light guide 910 such that the light captured by that pixel repeatably impinges on only a single location on the image sensor. In this way, the angle-discrimination layer may help capture an image by capturing ambient light within a narrow range of incident angles for each pixel that is then directed to a correlated location on the image sensor 920. Given a known mapping of incident angles ($\theta_1, \theta_2, \theta_3, \ldots \theta_m$; $\phi_1, \phi_2, \phi_3, \ldots \phi_m$) of scattered ambient light to image sensor 920 location, a processor may be capable of generating a digital, pixilated image including pixels properly correlated and arranged in a display to display a two-dimensional image. In some implementations, each pixel is configured to capture light from a particular range of acceptance angles, thereby limiting the captured light to a particular part of a scene and the pixel is configured to direct the captured light only to its particular correlated location on the image sensor 920. Thus, each pixel repeatably captures a specific part of a scene and directs light from this part to a known location on the image sensor. As a result, light information at a particular location on the image sensor is understood to correspond to a particular part of a scene and thus the scene can be reconstructed since optical information (such as color and/or intensity) for each part of the scene is provided by the pixels correlated with different locations on the image sensor.

With continued reference to FIG. 9C, in some implementations as noted above, light-turning pixels $P_1, P_2, P_3, \ldots P_m$ may be configured to act upon different center polar and center azimuth angles of incidence $(\theta_1, \theta_2, \theta_3, \ldots \theta_m; \phi_1, \phi_2, \phi_3, \ldots \phi_m)$. In various implementations, the center polar angles of incidence $\theta_1, \theta_2, \theta_3, \ldots \theta_m$ may range from about $-90°$ to about $+90°$, measured from a normal to the front surface 911 of the light guide 910. In other implementations, the center polar angles of incidence $\theta_1, \theta_2, \theta_3, \ldots \theta_m$ may have a smaller range so that the imaging system 900 may be designed to capture images that are normal or close to normal from the front surface 911 of the light guide 910. For example, the center polar angles of incidence $\theta_1, \theta_2, \theta_3, \ldots \theta_m$ may be ± about 15, ± about 30, or ± about 40 in some implementations. Narrower ranges may be used in some cases to capture a higher resolution image of a distant object, in comparison to a broader range, since the distant object may occupy only a small part of a scene. Alternatively, the imaging system 900 may be designed to capture images that are further away from normal. Similarly, the center azimuth angles of incidence $\phi_1, \phi_2, \phi_3, \ldots \phi_m$ may in some implementations range from about 0° to about 360°. Hence, in implementations where the center polar angles of incidence $\theta_1, \theta_2, \theta_3, \ldots \theta_m$ range from $-90°$ to $+90°$ and the center azimuth angles of incidence $\phi_1, \phi_2, \phi_3, \ldots \phi_m$ range from 0° to 360°, the imaging system 900 may be capable of capturing the image of an entire hemisphere in front of the front surface 911 of the light guide 910. Other ranges also may be possible, depending upon the application, where the imaging system 900 is designed to capture an image in a particular quadrant or semi-hemisphere. In some implementations, the range of possible center polar angles of incidence $\theta_1, \theta_2, \theta_3, \ldots \theta_m$ depends upon the particular value of the center azimuth angles of incidence $\phi_1, \phi_2, \phi_3, \ldots \phi_m$. For example, the imaging system 900 may be configured to simulate the capability of a standard 35 mm camera, which captures a rectangular portion of a scene. The angular range of a 35 mm camera may be described by the angular range of a diagonal of the rectangular captured image. Alternatively, the angular range may be described by the angular range along the horizontal direction of the rectangular image and the angular range along the vertical direction of the rectangular image. In some implementations, in terms of horizontal and vertical ranges, the center polar angles of incidence $\theta_1, \theta_2, \theta_3, \ldots \theta_m$ may have values within a range of 0° to about ±20° from a normal to the front surface 911 for a first given center azimuth angle of incidence, and the center polar angles of incidence $\theta_1, \theta_2, \theta_3, \ldots \theta_m$ may have values within a range of 0° to about ±14° from a normal to the front surface 911 for a second given center azimuth angle of incidence perpendicular to the first given center azimuth angle of incidence.

Figure 9D:
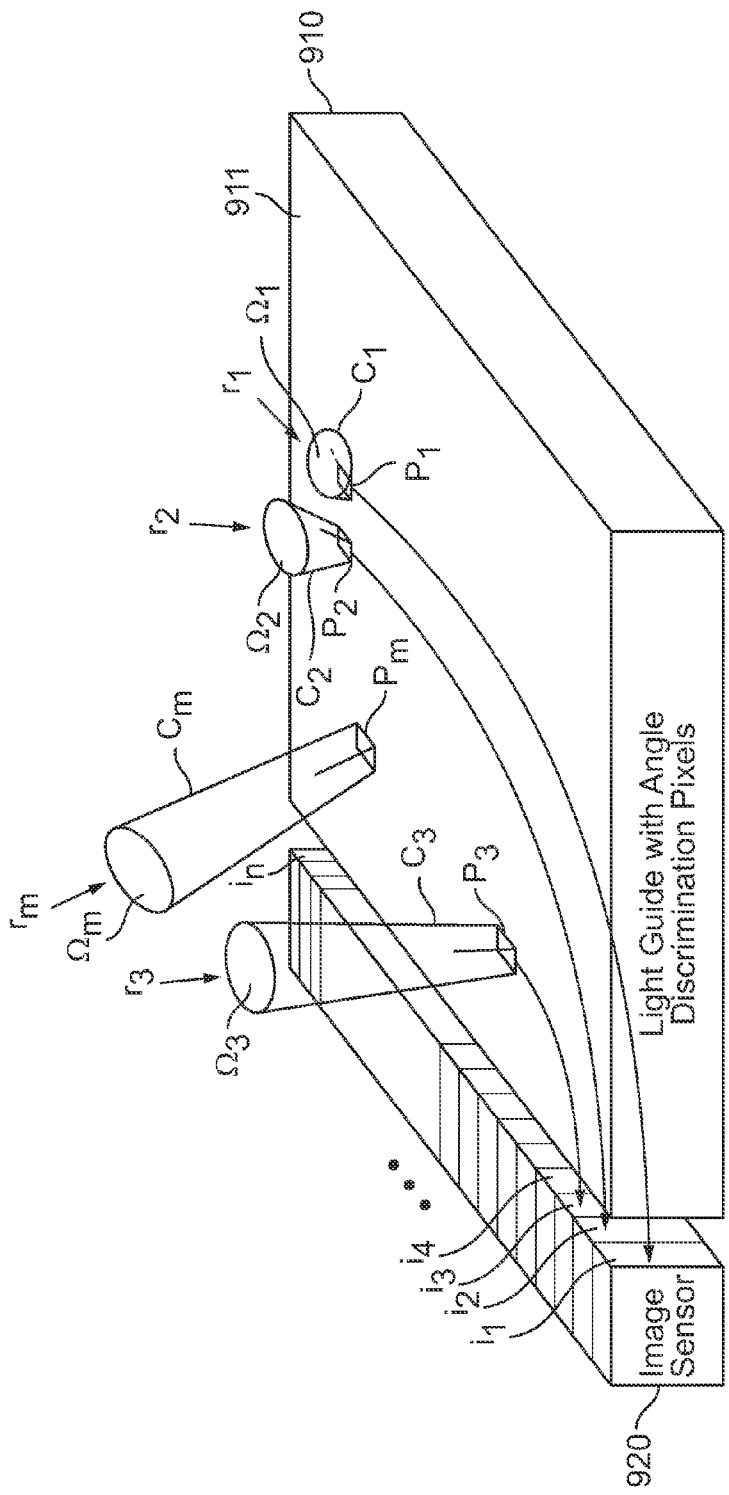
FIG. 9D shows an example of a perspective view of a plurality of light-turning pixels disposed on the surface of a light guide, where each pixel accepts ambient light within an acceptance cone centered about a center polar and azimuth acceptance angle.

With reference to FIG. 9D, an example of a perspective view of a plurality of light-turning pixels disposed on the surface of a light guide, where each pixel accepts ambient light within an acceptance cone centered about a center polar and azimuth acceptance angle, is shown. The light-turning pixels $P_1, P_2, P_3, \ldots P_m$ illustrated in FIG. 9D may be similar to the pixels of FIG. 9C, except that the pixels shown in FIG. 9D are shown as rectangular pixels that may form a grid of pixels. It is understood, however, that the pixels may have other shapes, such as circular, hexagonal, or other arbitrary shape, as desired, depending upon the application or the manufacturing process. Similarly, the pixels may have different shapes or sizes from one another. The implementation of FIG. 9D also illustrates light-turning pixels $P_1, P_2, P_3, \ldots P_m$ that have acceptance cones $C_1, C_2, C_3, \ldots C_m$ which are centered about different center polar and center azimuth angles of incidence. The cones each have an apex roughly corresponding with one of the light-turning pixels $P_1, P_2, P_3, \ldots P_m$. While each of the acceptance cones $C_1, C_2, C_3, \ldots C_m$ accept ambient light scattered from an object to be imaged incident upon the front surface 911 at a different angle of incidence, the acceptance cones $C_1, C_2, C_3, \ldots C_m$ are illustrated as subtending a solid angle $\Omega_1, \Omega_2, \Omega_3, \ldots \Omega_m$ of the same size.

Figure 9E:
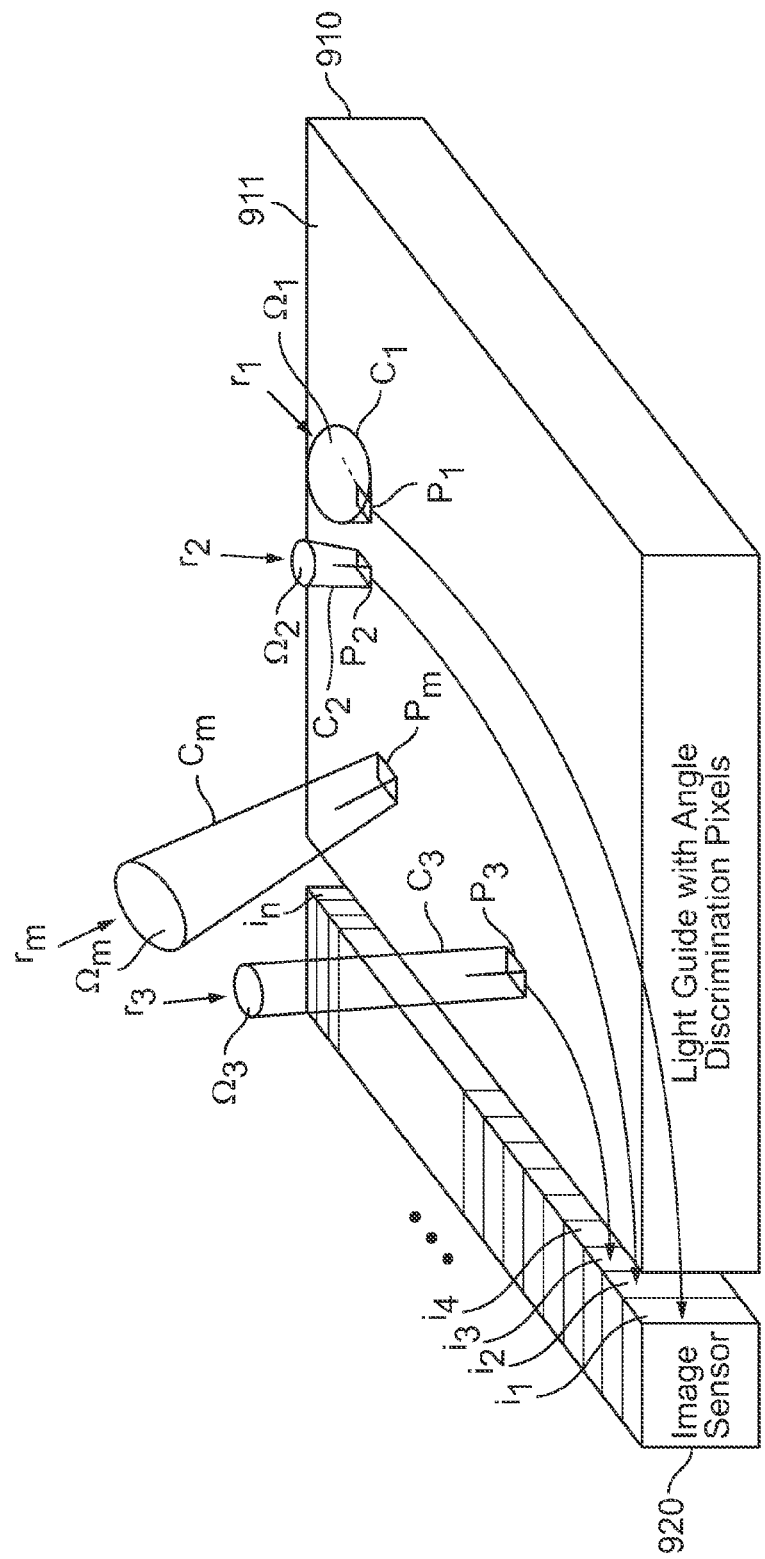
FIG. 9E shows an example of a perspective view of a plurality of light-turning pixels, where different pixels have different sized acceptance cones.

With reference to FIG. 9E, an example of a perspective view of a plurality of light-turning pixels, where different pixels have different sized acceptance cones, is shown. For example, pixel $P_1$ is shown with a relatively large cone of acceptance (and a relatively large solid angle $\Omega_1$), while pixels $P_2$ and $P_3$ are illustrated with relatively small cones of acceptance (and relatively small solid angles $\Omega_2$ and $\Omega_3$). In some implementations, the size of the acceptance cone $C_1, C_2, C_3, \ldots C_m$ for a particular pixel may depend upon the center polar and center azimuth angle of incidence that the pixel is configured to accept. For example, some pixels may be configured to accept incident rays of ambient light that are within close to normal from the front surface 911 of the light guide 910. Worded in another way, some pixels may be configured to accept incident rays near the center of the field of view. Such pixels may be configured to have a relatively small cone of acceptance compared to pixels configured to accept incident rays on a periphery of the field of view, where such peripheral pixels may have relatively large cones of acceptance. Different light-turning pixels $P_1, P_2, P_3, \ldots P_m$ having different size acceptance cones implies that different light-turning pixels $P_1, P_2, P_3, \ldots P_m$ have different ranges of polar acceptance angles and different ranges of azimuth acceptance angles.

Figure 10A:
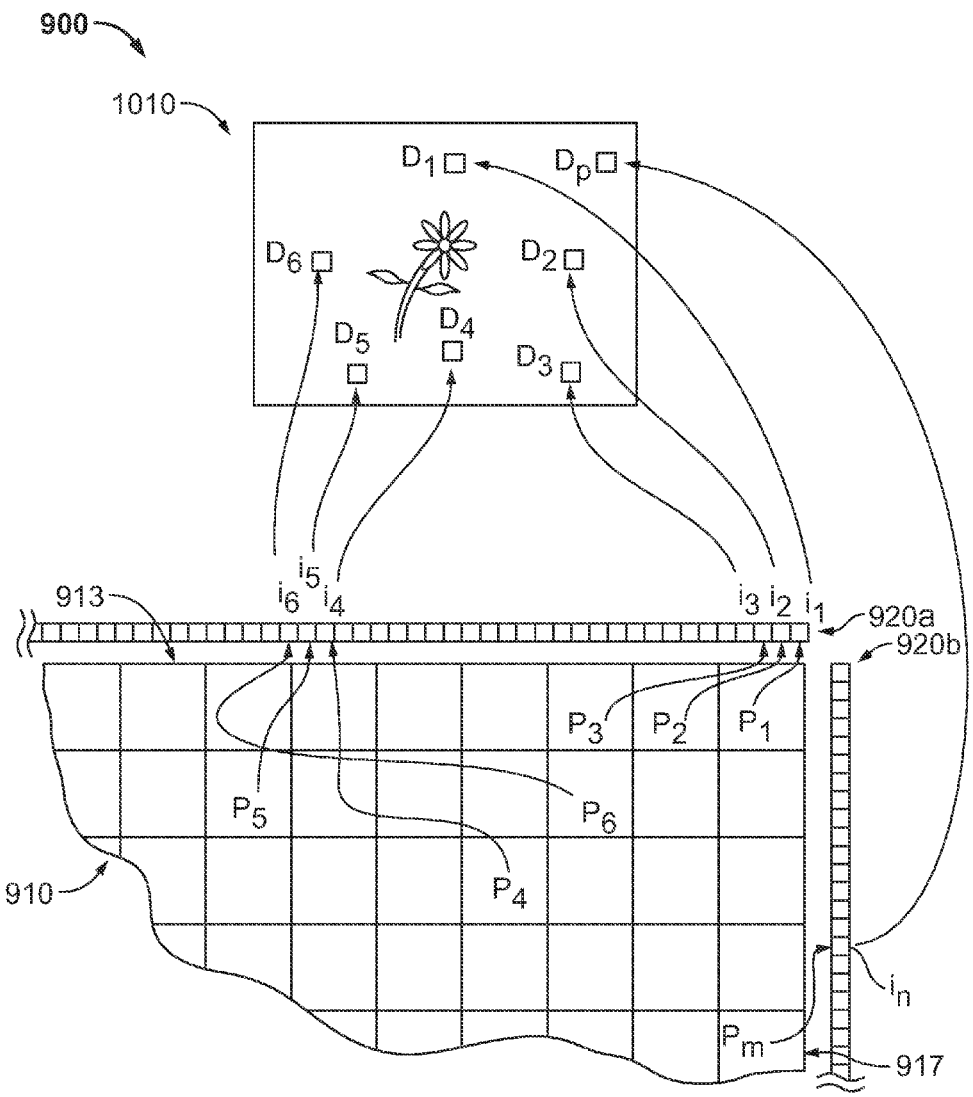
FIGS. 10A-10C show examples of top-down views of light-turning pixels illustrating various ways of correlating light-turning pixels with locations on an image sensor.
Figure 10B:
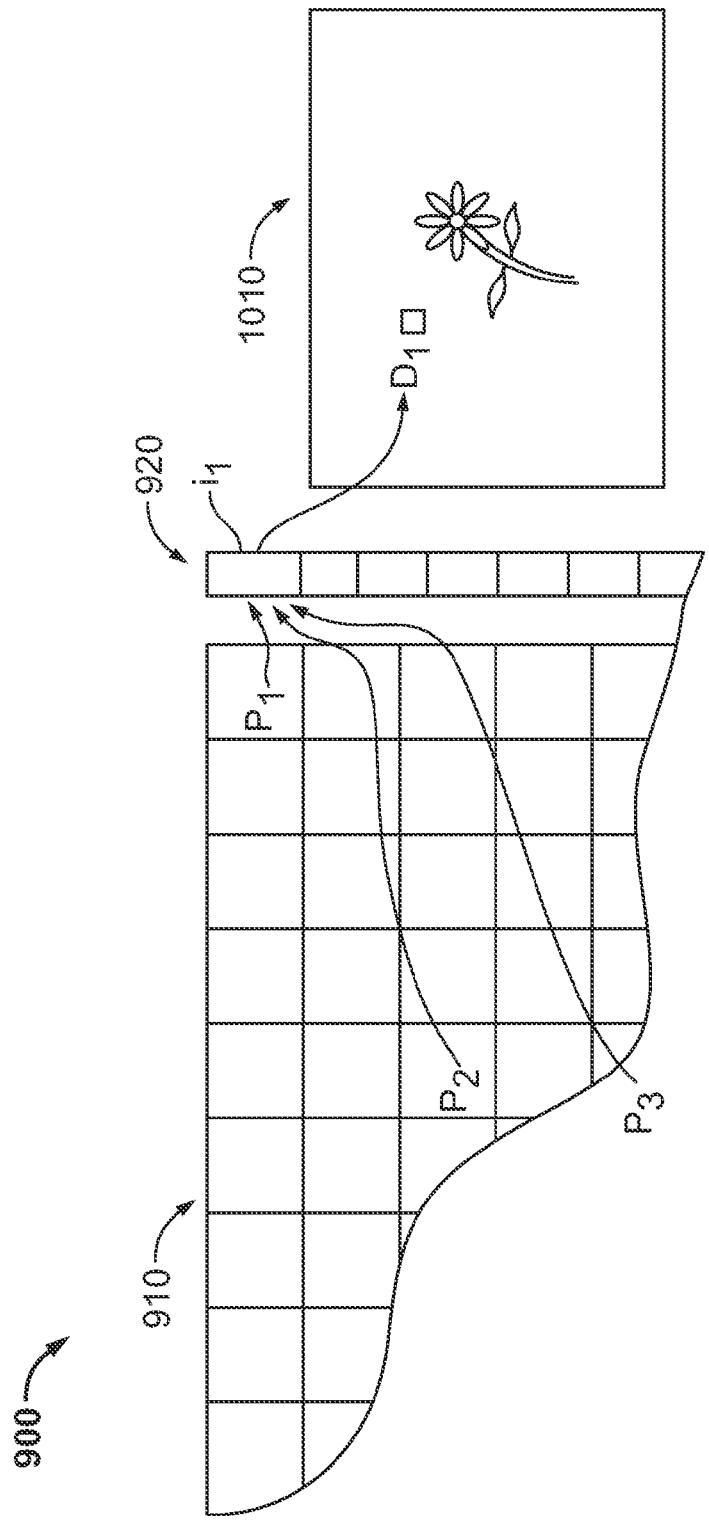
Figure 10C:
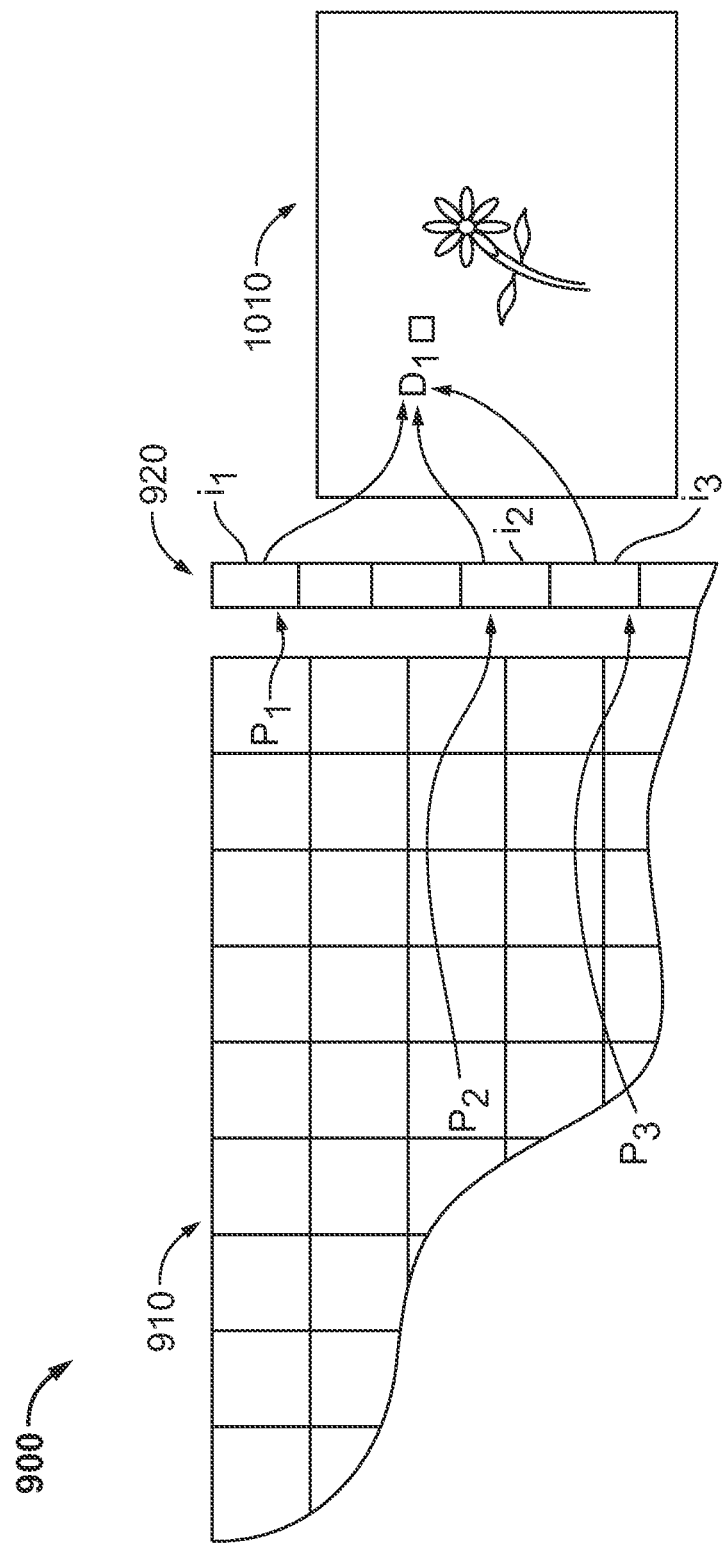

With reference now to FIGS. 10A-10C, examples of top-down views of light-turning pixels illustrating various ways of correlating between light-turning pixels and locations on an image sensor are shown. In some implementations, for an image to be captured, and for the captured image to be saved as digital data to later be displayed on a display, scattered light from various parts of the image may be captured and directed to various locations on an image sensor. To later generate the image, a mapping of the two-dimensional location of the various parts of the image to specific locations on an image sensor may be useful. In many standard digital cameras, the location on the image sensor may roughly correspond to the location in a two-dimensional image. For example, in many standard digital cameras, scattered ambient light focused by a camera lens on the upper right hand corner of the image sensor may roughly correspond or correlate to pixels in the upper right hand corner of the generated image later displayed on a display.

In the imaging system 900 such a correspondence may or may not be present. In some implementations, such a correspondence may be useful in order to later generate an image displayable on a display screen by providing a known mapping of the light-turning pixels $P_1, P_2, P_3, \ldots P_m$ to locations $i_1, i_2, i_3, \ldots i_n$, which follow the same sequence and relative spatial orientation to one another as the pixels $P_1, P_2, P_3, \ldots P_m$ and to the parts of a scene captured by each of the pixels.

In some other implementations, the pixels $P_1, P_2, P_3, \ldots P_m$ are configured to capture and direct the captured light to one of the correlated locations $i_1, i_2, i_3, \ldots i_n$ and the correlation between the pixels $P_1, P_2, P_3, \ldots P_m$ and the locations $i_1, i_2, i_3, \ldots i_n$ may not match the actual physical location of the pixel in a later generated image to the actual physical location of the pixel in the image sensor. For example, in the implementation of FIG. 10A, the light-turning pixels $P_1, P_2, P_3, \ldots P_m$ are configured to direct ambient light accepted by the pixels to a correlated location $i_1, i_2, i_3, \ldots i_n$ on the image sensor, where the image sensor includes two image sensors 920a and 920b disposed along edges 913 and 917 of the light guide 910. However, the relative locations of the pixels in the light guide 910 may not match the relative positions of the correlated locations in the image sensors 920a and 920b. Furthermore, the relative positions of the locations $i_1, i_2, i_3, \ldots i_n$ on the image sensor may not match the relative positions of the pixels in a final generated image 1010.

With continued reference to FIG. 10A, if the mapping of light-turning pixels $P_1, P_2, P_3, \ldots P_m$ to correlated locations $i_1, i_2, i_3, \ldots i_n$, respectively, on the image sensors 920a and 920b is known, and the angle-discrimination properties (i.e., which pixels are configured to capture light from which polar and azimuth angles of incidence) of the light-turning pixels $P_1, P_2, P_3, \ldots P_m$ are also known, data representing the captured image may be saved and later displayed on a display screen. The mapping or correlation is illustrated in FIG. 10A by arrows from pixels $P_1, P_2, P_3, \ldots P_m$ to correlated location $i_1, i_2, i_3, \ldots i_n$ on the image sensors 920a and 920b and also by arrows from correlated location $i_1, i_2, i_3, \ldots i_n$ on the image sensors 920a and 920b to locations (pixels, illustrated as squares $D_1, D_2, D_3, \ldots D_p$) on a final generated image 1010.

As illustrated in the examples of FIGS. 10B and 10C, the correlation of light turning pixels $P_1, P_2, P_3, \ldots P_m$ to location $i_1, i_2, i_3, \ldots i_n$, respectively, on the image sensor(s) 920 may be, for example, two or more to one (e.g., three to one) and need not be one to one. For example, as illustrated in FIG. 10B, light-turning pixels $P_1, P_2$ and $P_3$ are all correlated to location $i_1$ on image sensor 920. Location $i_1$ on image sensor 920 may then be mapped or correlated to a single pixel, such as pixel $D_1$ on a final generated image 1010.

In such an implementation, it may be useful for some, e.g., two or more of the pixels $P_1, P_2, P_3, \ldots P_m$ to have the same or similar cones of acceptance or similar center polar and center azimuth angles of acceptance. Such an implementation may be useful to create redundancy in the discrimination layer so that if the surface of the discrimination layer on the light guide 910 is damaged or compromised in an area around one pixel, e.g., pixel $P_1$, ambient light from the appropriate incident direction may be captured instead by, e.g., pixels $P_2$ and $P_3$ to provide an accurate image. Alternatively, as shown in FIG. 10C, light-turning pixels $P_1, P_2$ and $P_3$ may each be correlated to locations $i_1, i_2$ and $i_3$ on image sensor 920, however, locations $i_1, i_2$ and $i_3$ on image sensor 920 may be mapped or correlated to the same pixel $D_1$ for a final generated image 1010. Therefore, as shown in FIGS. 10B and 10C, more than one of the light-turning pixel may be configured to direct captured ambient light toward a common, correlated location in the image sensor 920, or toward multiple locations on the image sensor 920 that are subsequently mapped to a single pixel or location for a finally generated image 1010.

Figure 11A:
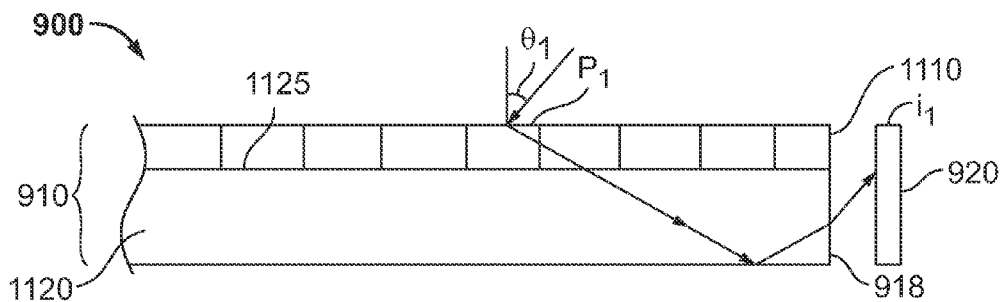
FIGS. 11A-11E show different locations for placement of an image sensor with respect to a light guide having a plurality of light-turning pixels.
Figure 11B:
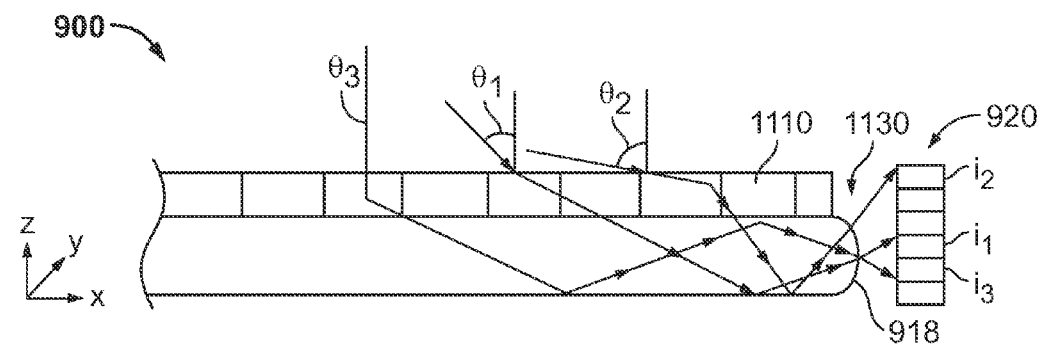
Figure 11C:
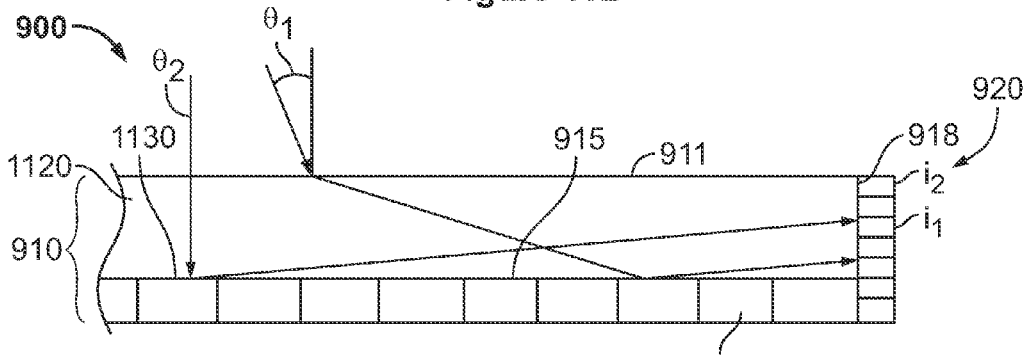
Figure 11D:
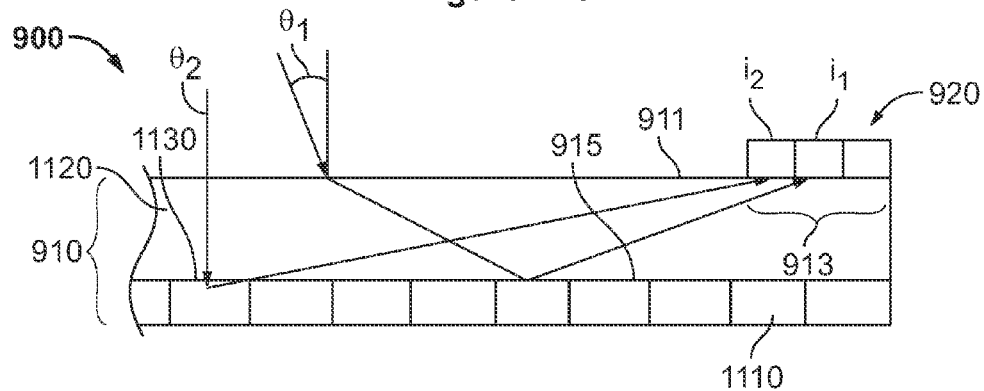
Figure 11E:
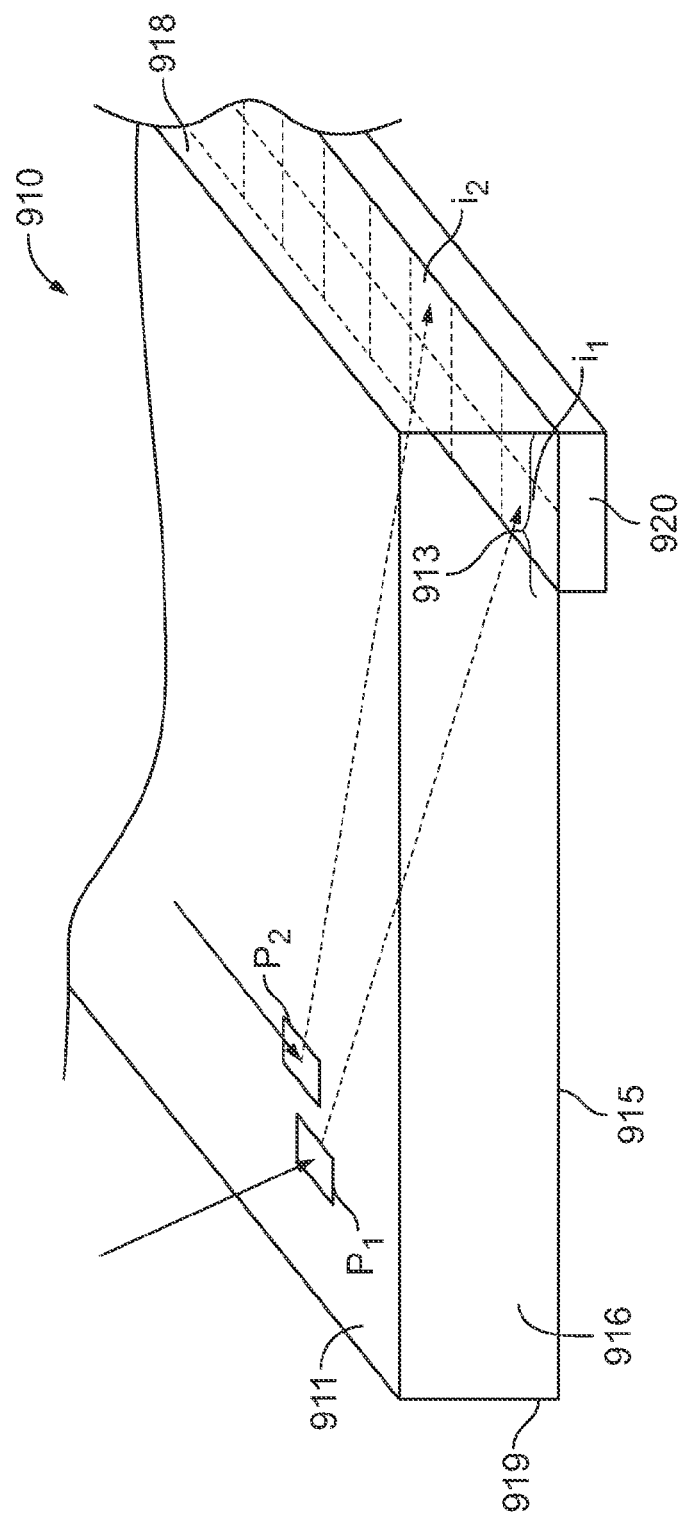

With reference now to FIGS. 11A-11E, different locations for placement of an image sensor with respect to a light guide having a plurality of light-turning pixels are shown. FIGS. 11A-11D show cross-sections in an x-z plane of an imaging system 900 similar to the imaging system 900 of FIG. 9A, while FIG. 11E shows a perspective view. For example, FIG. 11A illustrates an implementation of an imaging system 900 with a light guide 910 including a pixilated light-turning layer 1110 formed on a substrate 1120. In the illustrated implementation, the pixilated light-turning layer 1110 is formed on a front surface 1125 of the substrate 1120. Also shown in FIG. 11A, pixel $P_1$ is configured to capture ambient light incident upon the pixel at a polar angle of incidence $\theta_1$ and to selectively direct the captured light ray toward location $i_1$ on the image sensor 920. As illustrated in FIG. 11A, the image sensor 920 is disposed along an edge 918 of the light guide 910.

With reference now to FIG. 11B, the image sensor 920 may, in some implementations, be a two-dimensional sensor. As shown in FIG. 11B, the image sensor 920 includes multiple locations or cells $i_1, i_2, i_3$ along the z-axis. However, since FIG. 11B is a cross-section in the x-z plane, the image sensor 920 also may include cells along the y-axis, and hence the image sensor 920 may be a two-dimensional sensor with separate cells in both the y- and z-axis along a y-z plane. Furthermore, the implementation of FIG. 11B illustrates a lens 1130 disposed between the light-output surface (illustrated here as edge 918) and the image sensor 920. As illustrated, the lens 1130 is integral with the light-output surface. It is possible in some implementations, however, for the lens 1130 to be separately formed and then later attached to or otherwise disposed between the edge 918 and the image sensor 920. The lens 1130 may improve the correspondence of pixels with the image sensor 920 by spreading out light from different pixels so that light that might otherwise strike the same location on an image sensor 920 is spread out so as to strike different locations $i_1, i_2, i_3$ of the image sensor 920. While two-dimensional image sensor 920 is illustrated here in combination with lens 1130, other implementations of the light guide 910, including the light guide 910 without an integral lens, may include a two-dimensional image sensor 920. However, in some implementations, the lens 1130 may be useful in directing light toward an appropriate correlated location on the two-dimensional image sensor 920.

With reference now to FIGS. 11C-11E, the image sensor 920 may be disposed relative to the light guide 910 in various ways. For example, while the implementation of FIG. 11C illustrates the image sensor 920 disposed on edge 918 (edge 918 being disposed between the front surface 911 and the back surface 915 of the light guide 910) of the light guide 910, FIG. 11D illustrates the image sensor 920 disposed facing a portion of the front surface 911 of the light guide 910. Alternatively, FIG. 11E illustrates the image sensor 920 disposed facing a back surface 915 of the light guide 910, opposite the front surface 911 on which the light turning pixels are disposed. Hence, in various implementations, the light-output surface 918 of the light guide 910 may include portions of one or more edges of the light guide 910, the front surface 911 of the light guide 910, and the back surface 915 of the light guide 911 opposite the front surface 911. While FIGS. 11A-11E show only one image sensor formed on one light-output surface of the light guide 920 for ease of illustration, in some implementations the imaging system 900 includes one or more additional image sensors disposed along one or more additional light-output surfaces of the light guide 910. Hence, with reference to FIG. 11E by way of example, in addition to the image sensor 920 shown facing the back surface 915 of the light guide 910, an additional image sensor (not illustrated) may be disposed facing one or more of the front surface 911, and/or one of edges 916, 917, 918 and 919. In some implementations, more than one image sensor 920 may be disposed facing the same surface. In such implementations, FIG. 11E, for example, may include an additional image sensor (not illustrated) disposed on another portion of the back surface 915 than the portion already facing the illustrated image sensor 920.

Briefly returning to FIGS. 11C and 11D, some implementations of the imaging system 900 may include an angle discriminating layer, illustrated as a pixilated light-turning layer 1110 in FIGS. 11C and 11D, formed on a back surface 1130 of substrate 1120.

Figure 12:
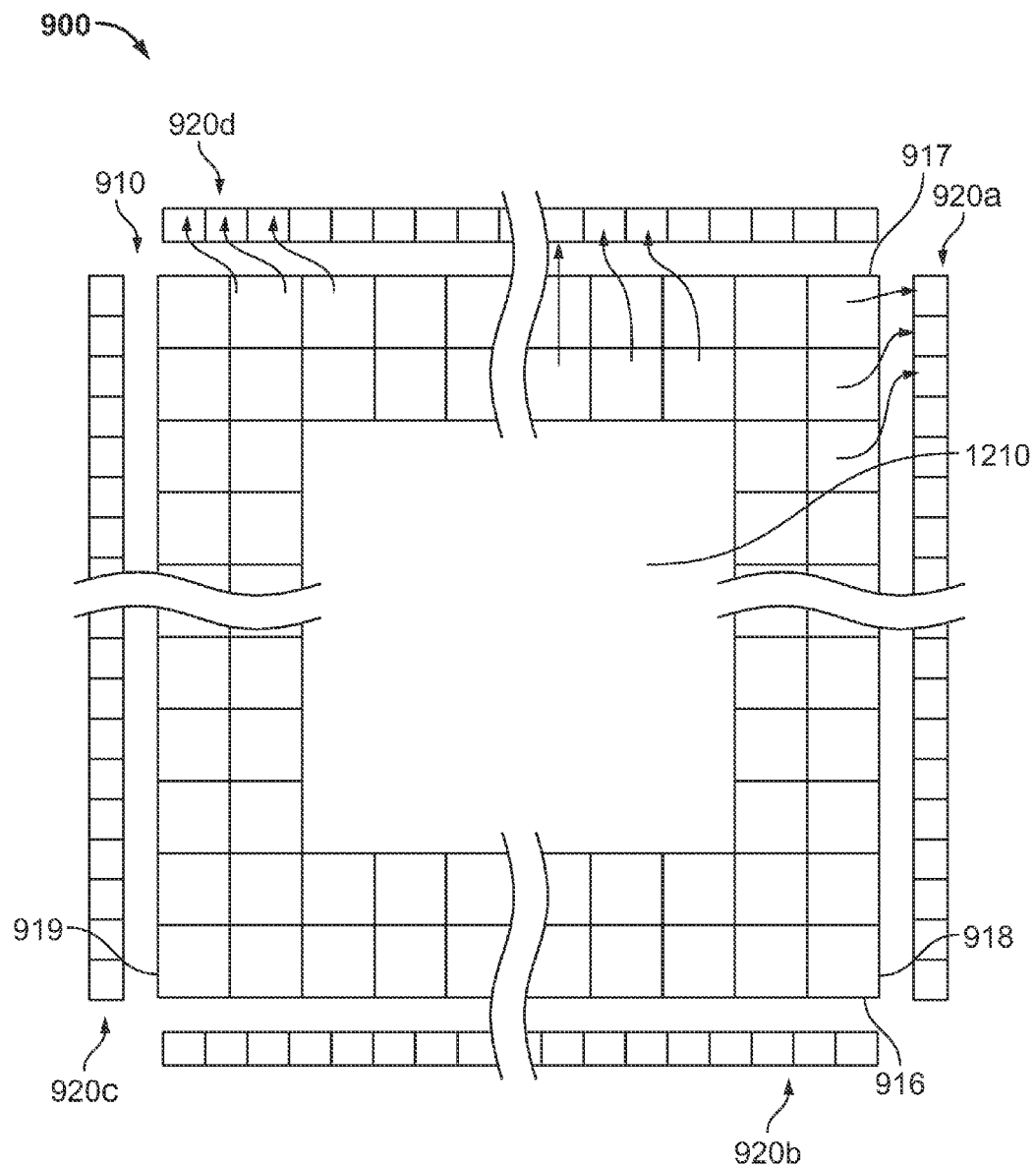
FIG. 12 shows an example of a top-down view of a light guide with a plurality of light-turning pixels disposed along a periphery of the light guide, where a center of the light guide does not include light-turning pixels.

With reference now to FIG. 12, an example of a top-down view of a light guide with a plurality of light-turning pixels disposed along a periphery of the light guide, where a center of the light guide does not include light-turning pixels, is shown. In some implementations, the light guide 910 may only include light-turning pixels along a periphery of the first surface (for example, a front surface or a back surface) of the light guide 910, with the center of the surface devoid of light-turning pixels. Such an implementation can decrease the path length of light traveling between a pixel and an image sensor that receives light from the pixels. As illustrated in FIG. 12, imaging system 900 includes image sensors 920a-d facing each of edges 916-919 of the light guide 910. As discussed earlier, light-turning pixels may be correlated to particular locations on the image sensors 920a-d, however, the relationship or correlation between the location of the light-turning pixels, the location on the image sensor, and/or the location of a pixel in a finally generated image may be arbitrary and may not be physical. If the angle-discrimination properties of the light-turning pixels are known, along with a mapping of the correlation of pixels to locations on the image sensor, then an image may be accurately captured.

Figure 13:
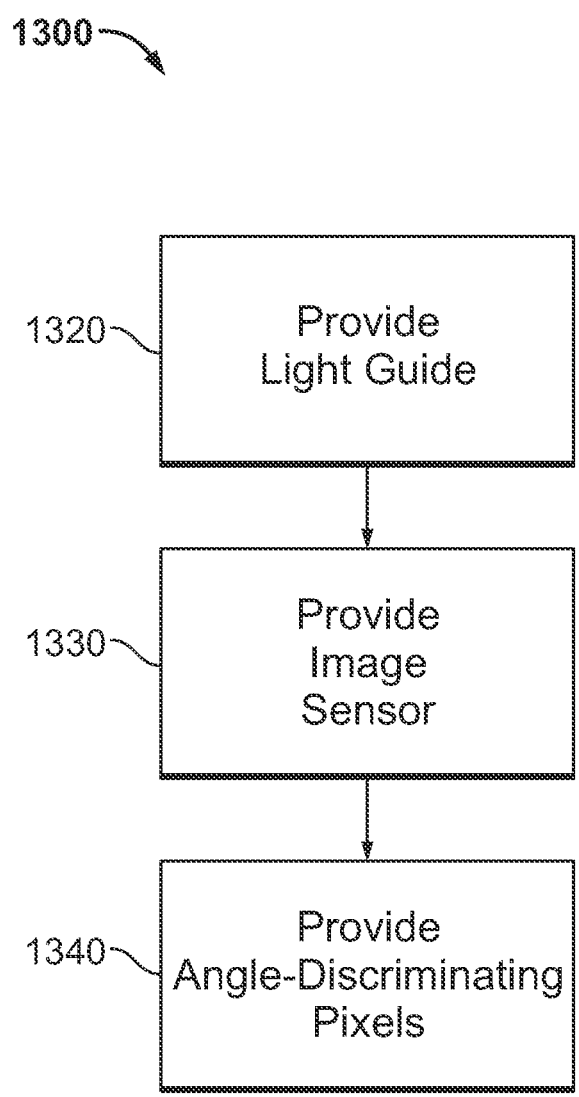
FIG. 13 shows an example of a flow diagram illustrating a manufacturing process for an imaging system including angle-discriminating pixels in a light guide and an image sensor.

With reference now to FIG. 13, an example of a flow diagram illustrating a manufacturing process for an imaging system including angle-discriminating pixels in a light guide and an image sensor is shown. Manufacturing process 1300 may begin at block 1320. Block 1320 includes providing a light guide, for example a light guide similar to light guide 910 illustrated in FIG. 9A to FIG. 12. The light guide may include a front surface capable of receiving ambient light and a light-output surface. The light-output surface may include one or more of a front surface, a back surface, or one or more edges disposed between the front and back surfaces. In some implementations, providing a light guide may include forming the light guide. Forming a light guide may include laminating multiple layers together or may include injection molding to form a light guide. In some implementations, forming a light guide includes forming a lens on the light-output surface of the light guide. Such a lens may be integral with the light guide or may be separately constituted and later attached to the light guide.

The process 1300 moves to block 1330 to include providing an image sensor, such as a one- or two-dimensional sensor. The image sensor may be disposed along the light-output surface of the light guide. This may include disposing the image sensor on one or more of the front surface of the light guide, the back surface of the light guide opposite the front surface, and the one or more edges of the light guide disposed between the front and back surface. In some implementations, the image sensor may face the light-output surface. When facing the light-output surface, the image sensor may or may not touch the light-output surface. In some implementations, multiple image sensors may be placed or disposed on more than one light-output surface or the same light-output surface.

The process 1300 moves to block 1340 to include providing angle-discriminating pixels on a first surface of the light guide of block 1320. The first surface may be a front surface, facing an object to be imaged, or a back surface, opposite the front surface. Providing angle-discriminating pixels may include laminating, attaching, or forming light-turning features including a plurality of light-turning pixels disposed on a first surface of the light guide. The angle-discriminating pixels may be configured to receive ambient light and to direct the received ambient light towards locations on the image sensor correlated to each pixel. The angle-discriminating pixels may discriminate among incident light rays and only act upon ambient light incident upon the pixels at particular angles of incidence (e.g., center polar and center azimuth angles of incidence) as well as angles close to the angles of incidence. In some implementations, the angle-discriminating pixels accept and act upon incident light rays that are within a given acceptance cone. Different pixels may differ in the particular angles of incidence or the given acceptance cones that the pixels act upon.

In some implementations, providing light-turning features on the surface of the light guide includes disposing a turning film over the first surface. Disposing a turning film over the first surface of the light guide may include recording a hologram on or in a holographic turning film attaching the holographic film to the light guide. The holographic turning film may be formed by a step and repeat process to thereby individually form multiple holographic pixels. Each pixel may be recorded on the lamination layer with different angle-discriminating properties. Recording the holographic turning film may therefore include forming light-turning pixels configured to selectively capture the ambient light incident on the pixels within a range of polar acceptance angles and a range of azimuth acceptance angles about a center polar acceptance angle and a center azimuth acceptance angle, where different pixels have different center polar and azimuth acceptances angles and/or different ranges of polar and azimuth acceptance angles. The angle-discriminating pixels of block 1340 may be configured by recording the hologram to selectively direct the captured ambient light to locations in the image sensor that are correlated with the different light-turning pixels.

Figure 14A:
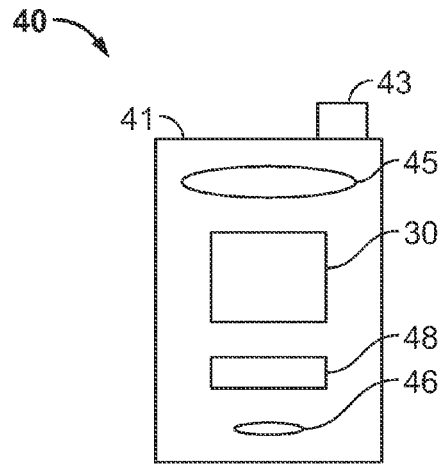
FIGS. 14A and 14B show examples of system block diagrams illustrating a display device that includes a plurality of interferometric modulators.
Figure 14B:
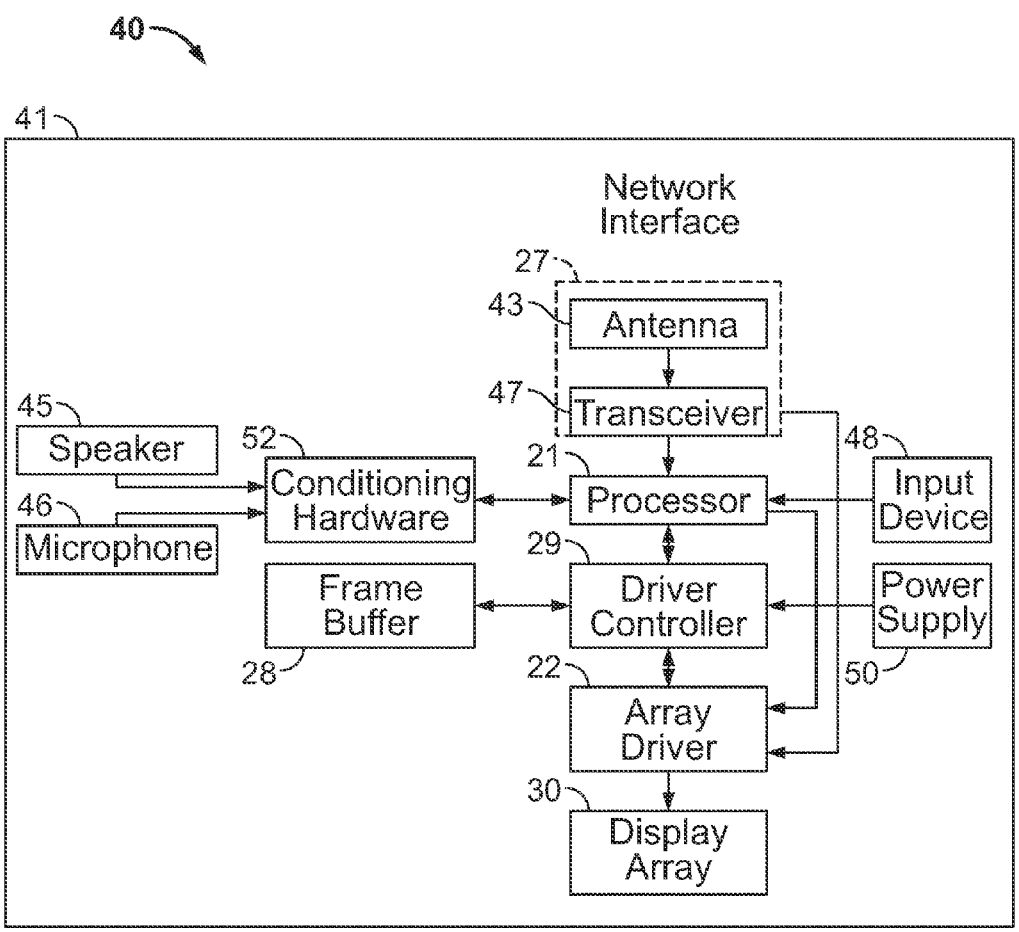

FIGS. 14A and 14B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An imaging system comprising:
   a light guide having:
      a first surface capable of receiving ambient light; and
      a light-output surface;
   an image sensor disposed along the light-output surface of the light guide; and
   light-turning features forming a plurality of light-turning pixels disposed on the first surface of the light guide, wherein the plurality of light-turning pixels are capable of selectively capturing the ambient light incident on the pixels within a range of acceptance angles and directing the selectively captured ambient light towards the image sensor, and wherein at least some of the light-turning pixels have ranges of acceptance angles different from others of the light-turning pixels.

2. The imaging system of claim 1, wherein the light-turning pixels include holographic pixels formed on or in a holographic turning film disposed on the first surface of the light guide.

3. The imaging system of claim 1, wherein at least some of the light-turning pixels selectively capture the ambient light incident on the pixels within a range of polar acceptance angles and a range of azimuth acceptance angles about a center polar acceptance angle and a center azimuth acceptance angle.

4. The imaging system of claim 3, wherein different light-turning pixels from the plurality of light-turning pixels have different center polar and center azimuth acceptance angles.

5. The imaging system of claim 4, wherein each of the different light-turning pixels directs the ambient light to locations in the image sensor that are correlated with the different light-turning pixels.

6. The imaging system of claim 5, wherein more than one of the different light-turning pixels direct the ambient light toward a common, correlated location in the image sensor.

7. The imaging system of claim 3, wherein different light-turning pixels have different ranges of polar acceptance angles and different ranges of azimuth acceptance angles.

8. The imaging system of claim 1, further comprising a lens disposed between the light-output surface and the image sensor.

9. The imaging system of claim 8, wherein the lens is integral with the light-output surface.

10. The imaging system of claim 1, wherein the image sensor is a two-dimensional sensor.

11. The imaging system of claim 1, wherein the light-turning pixels are capable of directing the ambient light toward the image sensor, the light including wavelengths outside of the visible spectrum.

12. The imaging system of claim 1, further comprising a display device underlying the light guide.

13. The imaging system of claim 12, wherein the display device is a reflective display.

14. The imaging system of claim 13, wherein the light guide forms part of a front light for the reflective display.

15. The imaging system of claim 1, further comprising one or more additional image sensors disposed along one or more additional light-output surfaces of the light guide.

16. The imaging system of claim 1, wherein the light-output surface includes portions of one or more of one or more edges of the light guide.

17. The imaging system of claim 1, wherein the light-output surface includes portions of the front surface of the light guide.

18. The imaging system of claim 1, wherein the light-output surface includes portions of a back surface of the light guide opposite the front surface.

19. The imaging system of claim 1, wherein the light-turning pixels are disposed along a periphery of the first surface of the light guide.

20. The imaging system of claim 1, wherein the light-turning pixels are formed in a pixilated light-turning layer.

21. The imaging system of claim 1, further comprising:
a display underlying the light guide;
a processor that is capable of communicating with the display, the processor being capable of processing image data; and
a memory device that is capable of communicating with the processor.

22. The imaging system of claim 21, further comprising:
a driver circuit capable of sending at least one signal to the display.

23. The imaging system of claim 22, further comprising:
a controller capable of sending at least a portion of the image data to the driver circuit.

24. The imaging system of claim 21, further comprising:
an image source module capable of sending the image data to the processor.

25. The imaging system of claim 24, wherein the image source module includes at least one of a receiver, transceiver, and transmitter.

26. The imaging system of claim 21, further comprising:
an input device capable of receiving input data and communicating the input data to the processor.

27. A method of manufacturing an imaging system, comprising:
providing a light guide having:
a front surface capable of receiving ambient light; and
a light-output surface;
providing an image sensor disposed along the light-output surface of the light guide; and
providing light-turning features forming a plurality of light-turning pixels disposed on a first surface of the light guide, wherein the light-turning pixels are capable of selectively capturing the ambient light incident on the pixels within a range of acceptance angles and directing the selectively captured ambient light towards the image sensor, wherein at least some of the light-turning pixels have ranges of acceptance angles different from others of the light-turning pixels.

28. The method of claim 27, wherein providing light-turning features on the surface of the light guide includes disposing a turning film over the first surface.

29. The method of claim 28, wherein disposing the turning film over the first surface of the light guide includes recording a holographic turning film and attaching the holographic turning film over the light guide.

30. The method of claim 29, wherein recording the holographic turning film includes forming light-turning pixels capable of selectively capturing the ambient light incident on the pixels within a range of polar acceptance angles and a range of azimuth acceptance angles about a center polar acceptance angle and a center azimuth acceptance angle.

31. The method of claim 30, wherein different light-turning pixels have different center polar and center azimuth acceptance angles.

32. The method of claim 31, wherein each of the different light-turning pixels is capable of directing the ambient light to locations in the image sensor that are correlated with the different light-turning pixels.

33. The method of claim 27, wherein providing the light guide includes forming a lens on the light-output surface of the light guide.

34. The method of claim 27, wherein providing the image sensor includes disposing the image sensor on one or more of the one or more edges of the light guide, the front surface of the light guide, and a back surface of the light guide opposite the front side.

35. An imaging system comprising:
a light guide having:
a front surface capable of receiving ambient light; and
a light-output surface;
an image sensor disposed along the light-output surface of the light guide; and
a plurality of angle-discrimination means for selectively capturing light from different incidence angles within a range of acceptance angles and directing the captured light toward the image sensor, the plurality of angle-discrimination means disposed on a first surface of the light guide, wherein at least some of the angle-discrimination means have ranges of acceptance angles different from others of the plurality of angle-discrimination means.

36. The imaging system of claim 35, wherein the plurality of angle-discrimination means includes a plurality of light-turning pixels disposed on the first surface of the light guide.

37. The imaging system of claim 36, wherein the plurality of light-turning pixels include holographic pixels formed on or in a holographic turning film disposed on the first surface of the light guide.

38. The imaging system of claim 37, wherein the first surface is the front surface.

* * * * *